(12) United States Patent
Zhang

(10) Patent No.: US 10,316,801 B2
(45) Date of Patent: Jun. 11, 2019

(54) METHOD AND SYSTEM FOR AN EXHAUST HEAT EXCHANGER

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 15/407,154

(22) Filed: Jan. 16, 2017

(65) Prior Publication Data

US 2018/0202396 A1 Jul. 19, 2018

(51) Int. Cl.
*F02M 26/04* (2016.01)
*F02M 26/33* (2016.01)
*F02M 26/28* (2016.01)
*F02M 26/16* (2016.01)
*F02M 26/24* (2016.01)
(Continued)

(52) U.S. Cl.
CPC ......... *F02M 26/04* (2016.02); *F02D 41/0007* (2013.01); *F02D 41/0065* (2013.01); *F02M 26/05* (2016.02); *F02M 26/16* (2016.02); *F02M 26/24* (2016.02); *F02M 26/25* (2016.02); *F02M 26/28* (2016.02); *F02M 26/33* (2016.02); *F02M 26/47* (2016.02); *Y02T 10/144* (2013.01); *Y02T 10/47* (2013.01)

(58) Field of Classification Search
CPC ........ F02M 26/05; F02M 26/33; F02M 26/28; F02M 26/16; F02M 26/24; F02M 26/47; F02M 26/04; F02M 26/25; Y02T 10/144; Y02T 10/47; F02D 41/0065; F02D 41/0007
See application file for complete search history.

(56) References Cited

U.S. PATENT DOCUMENTS

| 6,904,898 B1 * | 6/2005 | Sahlen ................... F02M 26/50 |
| | | 123/568.12 |
| 8,001,779 B2 | 8/2011 | Styles |
| 8,234,865 B2 | 8/2012 | Andrews |
| 8,464,524 B2 | 6/2013 | Bidner et al. |

(Continued)

FOREIGN PATENT DOCUMENTS

| DE | 10350521 A1 * | 6/2005 | ............. F28F 27/02 |
| DE | 102007019089 A1 * | 10/2008 | ............. F02M 26/25 |

(Continued)

OTHER PUBLICATIONS

Uhrich, Michael James, et al., "Method and System for Exhaust Gas Heat Recovery," U.S. Appl. No. 15/010,382, filed Jan. 29, 2016, 70 pages.

(Continued)

*Primary Examiner* — Mark A Laurenzi
*Assistant Examiner* — Wesley G Harris
(74) *Attorney, Agent, or Firm* — Julia Voutyras; McCoy Russell LLP

(57) ABSTRACT

Methods and systems are provided for exhaust gas heat recovery and exhaust gas recirculation (EGR) cooling using a single split heat exchanger. Exhaust heat from each of a first portion of exhaust routed to the intake manifold as EGR and a second portion of exhaust diverted via a bypass passage for exhaust heat recovery may be transferred to a coolant flowing through the heat exchanger. The direction of coolant flow via the heat exchanger may be adjusted based on the coolant temperature.

19 Claims, 10 Drawing Sheets

(51) Int. Cl.
*F02D 41/00* (2006.01)
*F02M 26/25* (2016.01)
*F02M 26/47* (2016.01)
*F02M 26/05* (2016.01)

(56) References Cited

U.S. PATENT DOCUMENTS

| | | | |
|---|---|---|---|
| 8,616,187 B2 | 12/2013 | Yamazaki et al. | |
| 2004/0074480 A1* | 4/2004 | Chen | F02M 26/43 123/568.12 |
| 2004/0194463 A1* | 10/2004 | Yanagisawa | F02B 29/0412 60/605.2 |
| 2009/0188477 A1* | 7/2009 | Gruner | F02M 26/73 123/568.12 |
| 2014/0196454 A1 | 7/2014 | Ulrey et al. | |
| 2015/0121848 A1 | 5/2015 | Pursifull | |

FOREIGN PATENT DOCUMENTS

| | | | | |
|---|---|---|---|---|
| FR | 2876417 A1 | * | 4/2006 | B60H 1/323 |
| WO | WO 2008066482 A1 | * | 6/2008 | F01N 3/043 |

OTHER PUBLICATIONS

Styles, Daniel Joseph, et al., "Method and System for Exhaust Gas Heat Recovery," U.S. Appl. No. 15/010,537, filed Jan. 29, 2016, 72 pages.

Uhrich, Michael James, et al., "Exhuast Heat Recovery and Hydrocarbon Trapping," U.S. Appl. No. 15/010,688, filed Jan. 29, 2016, 53 pages.

Schwartz, William Samuel, et al., "Method and System for Exhaust Gas Recirculation and Heat Recovery," U.S. Appl. No. 15/341,973, filed Nov. 2, 2016, 65 pages.

* cited by examiner

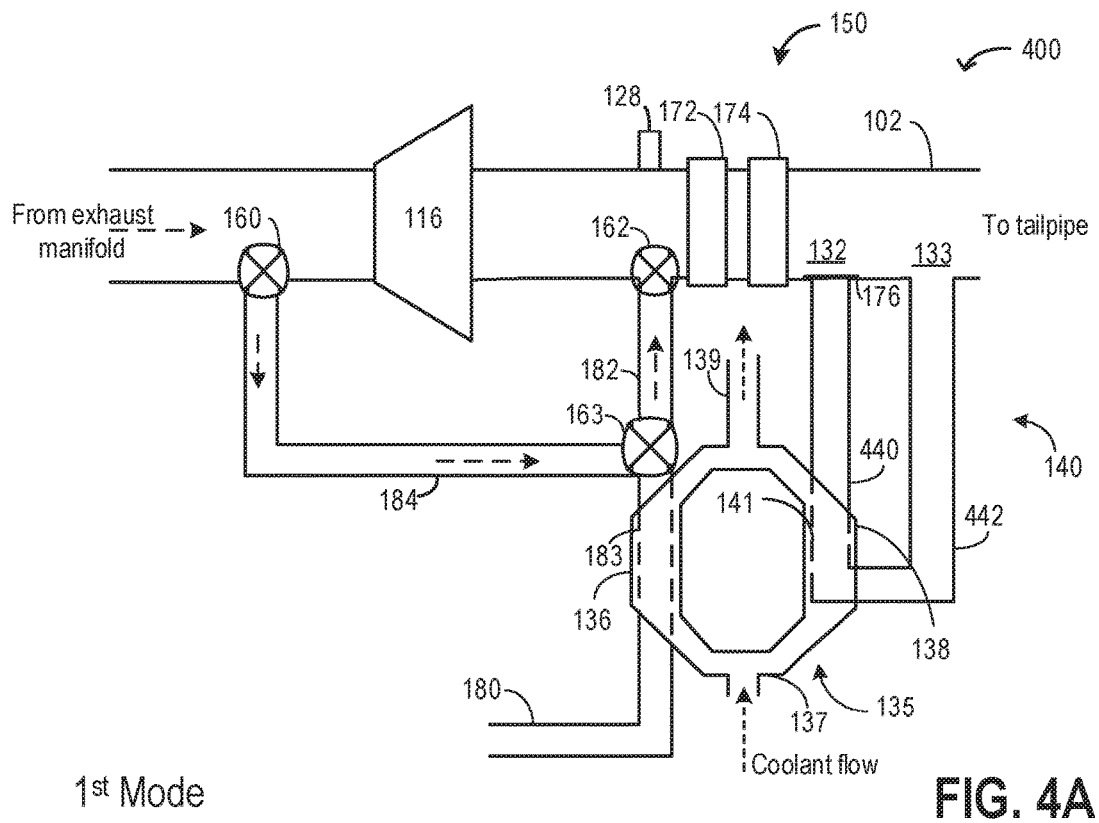
1st Mode  FIG. 4A
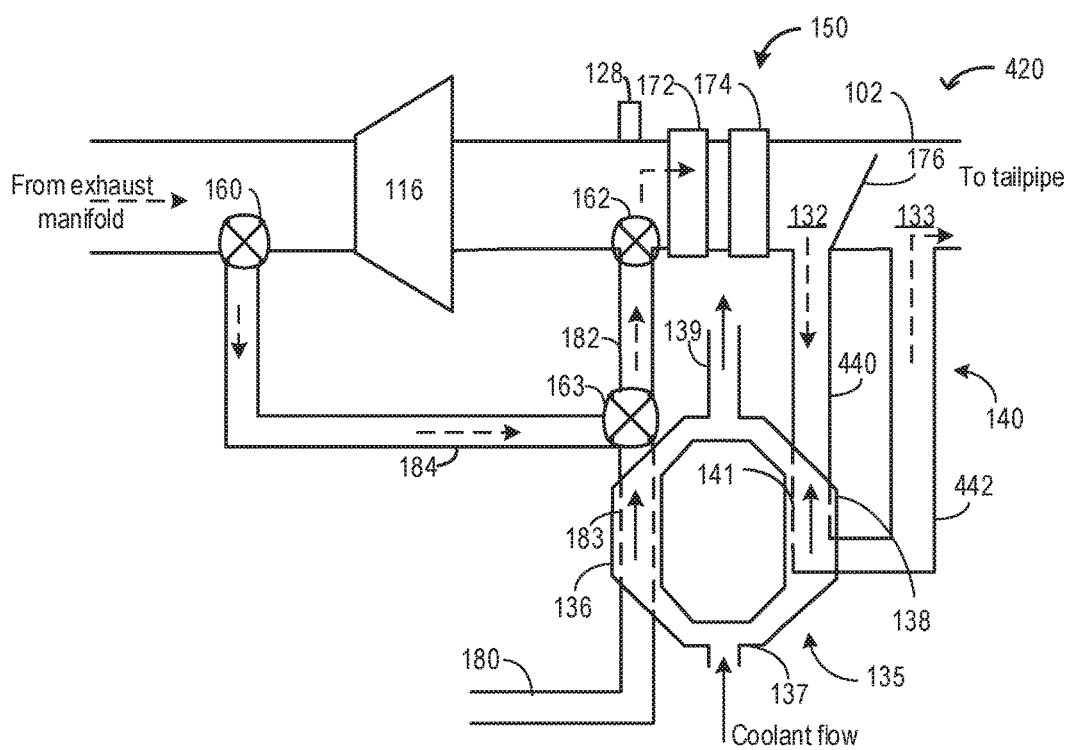
2nd Mode  FIG. 4B

| Operating mode | Engine condition | Valve_1 position | Valve_2 position | Valve_3 position | Diverter valve position |
|---|---|---|---|---|---|
| 1 | Cold-start within threshold duration | 2nd | 2nd | 1st | Closed |
| 2 | Cold-start after threshold duration | 1st | 2nd | 1st | Fully open |
| 3 | EGR desired, lower engine load | 3rd | 1st | 2nd | Partially open |
| 3 | Higher engine load | 3rd | 3rd | 3rd | Partially open |

FIG. 9

METHOD AND SYSTEM FOR AN EXHAUST HEAT EXCHANGER

FIELD

The present description relates generally to methods and systems for exhaust gas heat recovery and exhaust gas recirculation (EGR) cooling via a split heat exchanger.

BACKGROUND/SUMMARY

Engines may be configured with an exhaust heat recovery system for recovering heat of exhaust gas generated at an internal combustion engine. The heat recovered at an exhaust gas heat exchanger may be utilized for functions such as heating the cylinder head, and warming the vehicle cabin, thereby improving engine, and fuel efficiency. Exhaust heat may be utilized for expediting exhaust catalyst light-off and for maintaining catalyst temperature within a desired range for optimal catalyst performance. Cooled exhaust gas may be recirculated from upstream of exhaust catalysts to the intake manifold and used to reduce fuel consumption, and exhaust NOx emissions. An EGR cooler may be coupled to an EGR delivery system to bring down the temperature of recirculated exhaust gas before it is delivered to the intake manifold.

Various approaches are provided for exhaust heat recovery and EGR cooling. In one example, as shown in US 20140196454, Ulrey et al. discloses an engine system with a post-catalyst EGR cooler that may be opportunistically used to recover exhaust heat. During cold-start conditions, an exhaust throttle valve may be closed to direct exhaust through the EGR cooler wherein heat from the exhaust may be transferred to a coolant circulating through the EGR cooler. The warmed coolant may then be circulated through the engine to increase engine temperature. During such cold-start conditions, the EGR valve may be maintained in a closed position, and after flowing through the EGR cooler, the exhaust may return to the main exhaust passage via a bypass passage.

However, the inventors herein have recognized potential disadvantages with the above approach. As one example, it may not be possible to recover exhaust heat and simultaneously provide EGR. In the system shown by Ulrey et al., during any engine operating condition, exhaust sourced from a single location, downstream of the exhaust catalysts, may either be used for exhaust heat recovery or be delivered as EGR. Also, exhaust cannot be sourced from upstream of the catalysts for recirculation to the intake manifold. Further, due to the configuration of coolant flow, irrespective of the cooling needs, the same degree of cooling is provided during both EGR cooling and exhaust heat recovery. The coolant flow configuration may also result in overheating of coolant flowing through the heat exchanger, causing degradation of the coolant system.

The inventors herein have identified an approach by which the issues described above may be at least partly addressed. One example method comprises: transferring heat from a first portion of exhaust flowing through an exhaust gas recirculation (EGR) passage to coolant n a first branch of a heat exchanger, and transferring heat from a second portion of exhaust flowing through an exhaust bypass to coolant in a second branch of the heat exchanger, a direction of coolant floe through the first and the second branch selected based on coolant temperature. In this way, two portions of exhaust sourced from different locations in the main exhaust passage may be cooled simultaneously via a single split heat exchanger, while the direction of coolant flow through the heat exchanger is dynamically adjusted based on coolant temperature.

In one example, a boosted engine system may be configured with a single split heat exchanger configured for concurrent EGR cooling and exhaust heat recovery. A first exhaust bypass passage may couple a main exhaust passage from upstream of an exhaust turbine to an EGR delivery passage, the EGR delivery passage recirculating exhaust gas to an intake passage. A first branch of the heat exchanger may be coupled to the EGR delivery passage while a second branch of the heat exchanger is coupled to a second exhaust bypass passage, downstream of the first bypass passage and downstream of one or more exhaust catalysts. During cold start conditions, tailpipe emissions may be lowered by restricting (and retaining) exhaust within the exhaust manifold and first bypass passage for a threshold duration to increase exhaust heat transfer. After the threshold duration has elapsed, exhaust may be routed to the catalysts via the first bypass passage, bypassing the turbine. After flowing through the catalysts, exhaust from the main exhaust passage (from downstream of the exhaust catalysts) may be routed to the tailpipe via the second exhaust bypass passage to enable exhaust heat recovery at the heat exchanger. A diverter valve coupled to the main exhaust passage may be adjusted to regulate the portion of exhaust routed via the second bypass passage. Exhaust heat may be recovered via a coolant circulating through the heat exchanger. After catalyst light-off, a first portion of exhaust may be routed to the intake manifold from upstream or downstream of the turbine in the main exhaust passage via the first bypass passage and the EGR delivery passage based on engine load. A second portion of exhaust may be routed via the second bypass passage for exhaust heat recovery. Coolant may be routed simultaneously through each of the first and second branches of the heat exchanger to concurrently cool EGR flowing through the EGR passage and extract exhaust heat from exhaust flowing through the second bypass passage. Warmed coolant may then be used for engine and cabin heating, as required. A direction of coolant flow through the heat exchanger may be adjusted based on the exhaust cooling demand and coolant temperature. For example, when the exhaust cooling demand is higher (such as when the exhaust temperature is higher), a higher degree of heat transfer may be achieved by flowing coolant through each of the first and second branch of the heat exchanger in a direction opposite to the direction of exhaust flow through each of the EGR passage and the second bypass passage. In comparison, when the exhaust cooling demand is lower (such as when the exhaust temperature is lower), a lower degree of heat transfer may be achieved by flowing coolant through each of the first and second branch of the heat exchanger in the same direction as exhaust flow through each of the EGR passage and the second bypass passage. In alternate examples, coolant flow may be provided opposite to the direction of exhaust flow when the coolant temperature is lower (wherein the coolant can take up more exhaust heat), and coolant flow may be provided in the same direction as exhaust flow when the coolant temperature is higher (wherein the coolant can take up less exhaust heat).

In this way, by adjusting the direction of coolant flow through each branch of the heat exchanger, a desired level of exhaust heat transfer may be provided based on each of an EGR cooling demand and an engine heating demand. By opportunistically adjusting a direction of coolant flow through the heat exchanger based on coolant temperature, overheating of coolant may be averted. The technical effect of containing exhaust within a section of the exhaust manifold during cold start conditions is that cold-start emissions may be reduced while enhancing exhaust heat recovery in that section of the exhaust manifold. By routing hot exhaust directly to the catalysts bypassing the turbine, attainment of catalyst light-off temperatures may be expedited. By providing the functions of an EGR cooler and an exhaust gas heat exchanger via a single split heat exchanger, cost and component reduction benefits are achieved without limiting the functionality or capability of either system, and while enabling EGR to be sourced from both upstream and downstream of an exhaust turbine. By recovering heat from exhaust downstream of the catalysts, attainment of light-off temperature of catalysts may not be affected and temperature of the catalysts may be maintained above their light-off temperatures. Overall, by simultaneously providing EGR and exhaust heat recovery capabilities, fuel efficiency may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4A shows the first example embodiment of the split heat exchanger of FIG. 1, operating in a first mode.

FIG. 4B shows the first example embodiment of the split heat exchanger of FIG. 1, operating in a second mode.

FIG. 9 shows a table illustrating different modes of operation of an exhaust system with a split heat exchanger.

DETAILED DESCRIPTION

Figure 1:
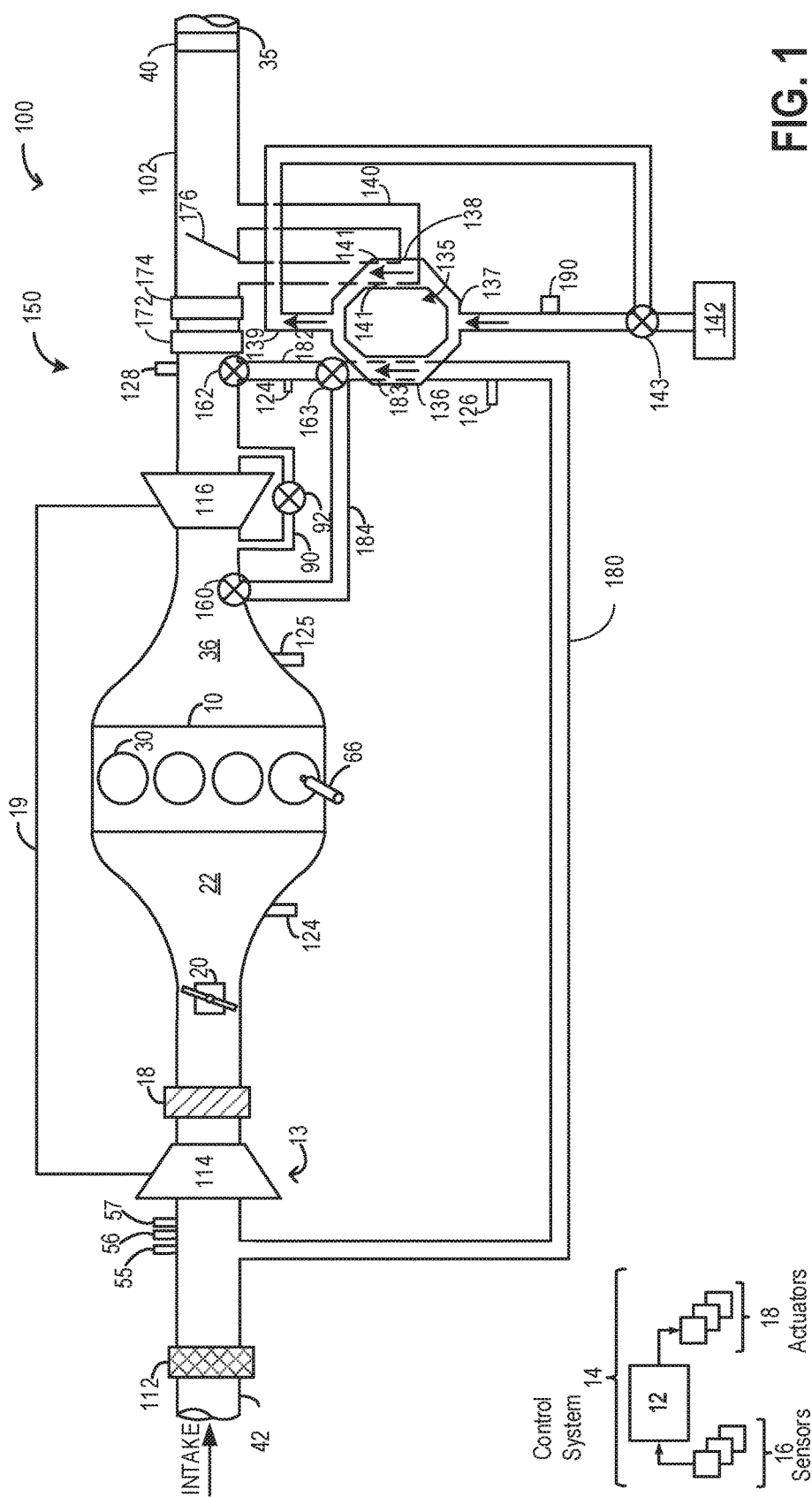
FIG. 1 shows a first example embodiment of an engine system including an exhaust system with a split heat exchanger.
Figure 2:
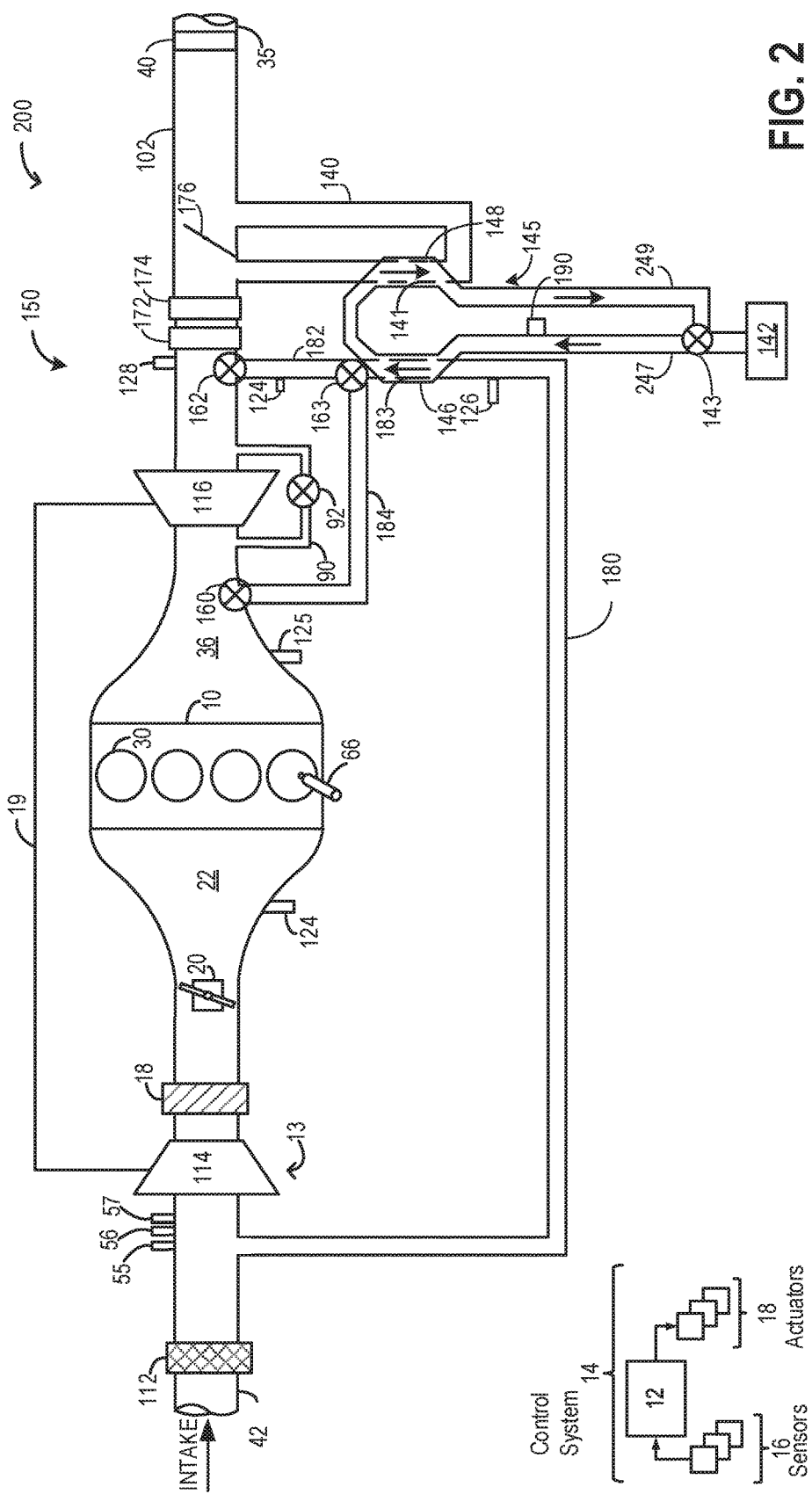
FIG. 2 shows a second example embodiment of an engine system including an exhaust system with a split heat exchanger.
Figure 3:
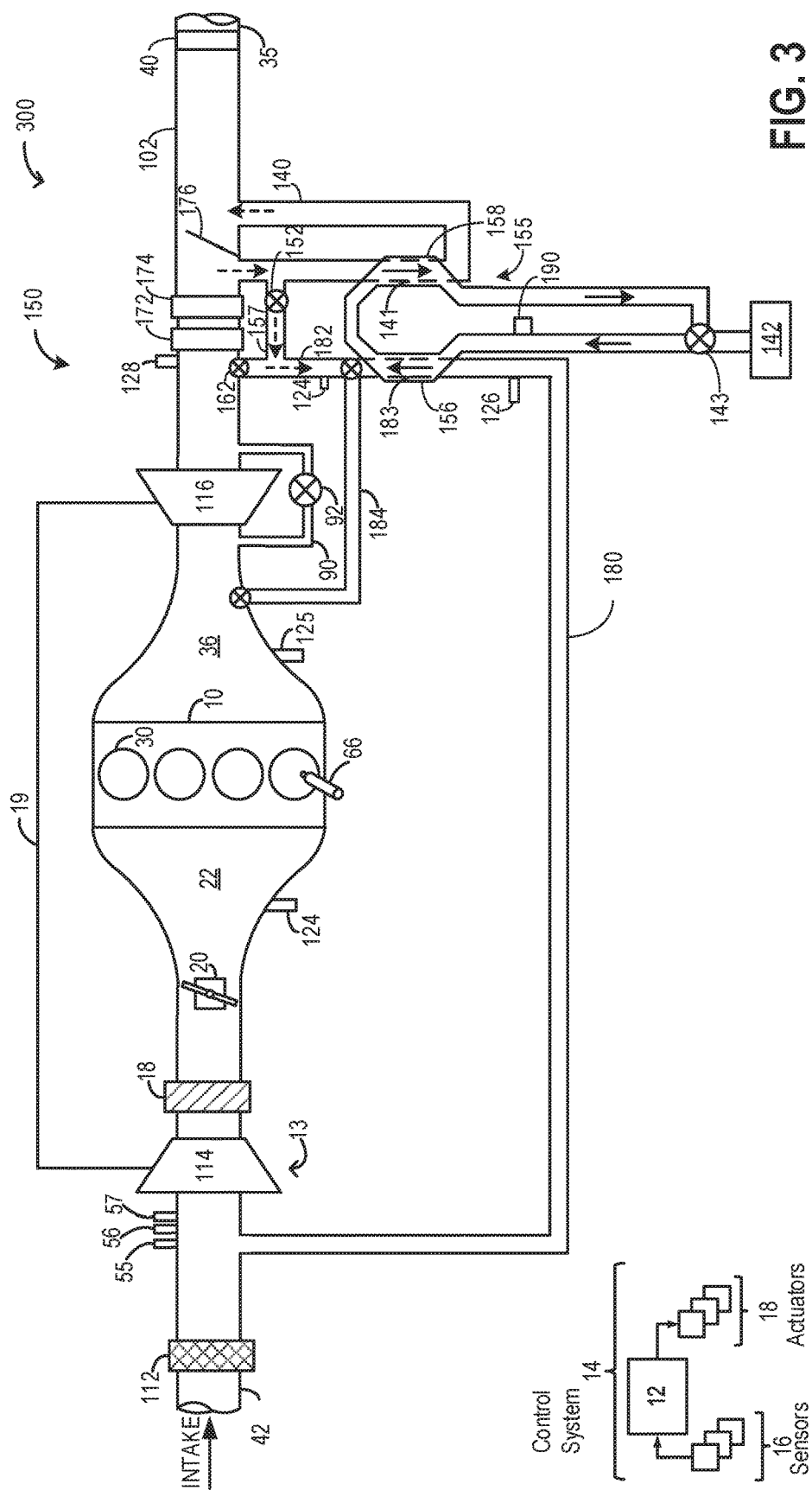
FIG. 3 shows a third example embodiment of an engine system including an exhaust system with a split heat exchanger.
Figure 7:
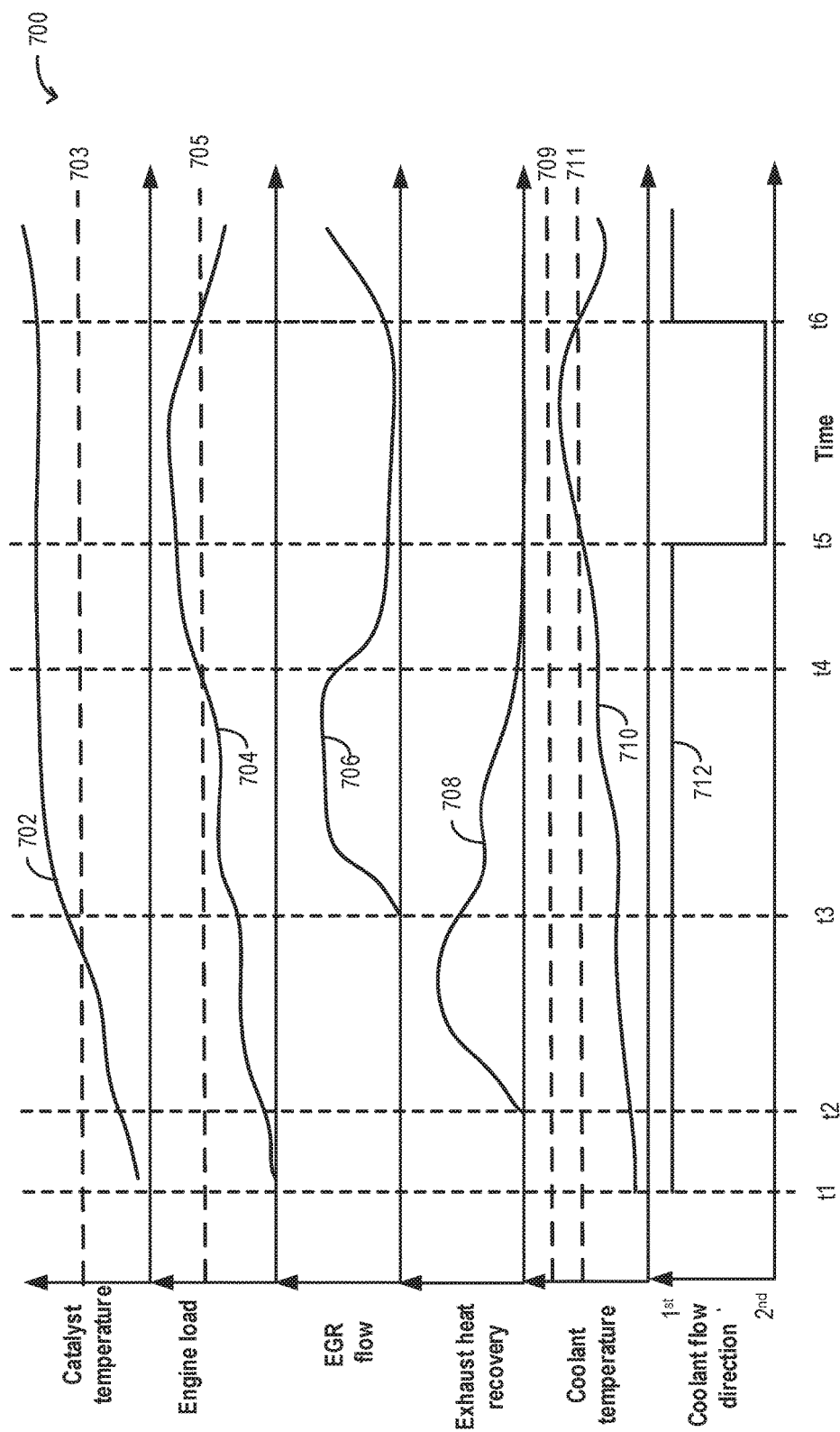
FIG. 7 shows an example adjusting of exhaust flow via an exhaust system, according to the present disclosure.
Figure 8:
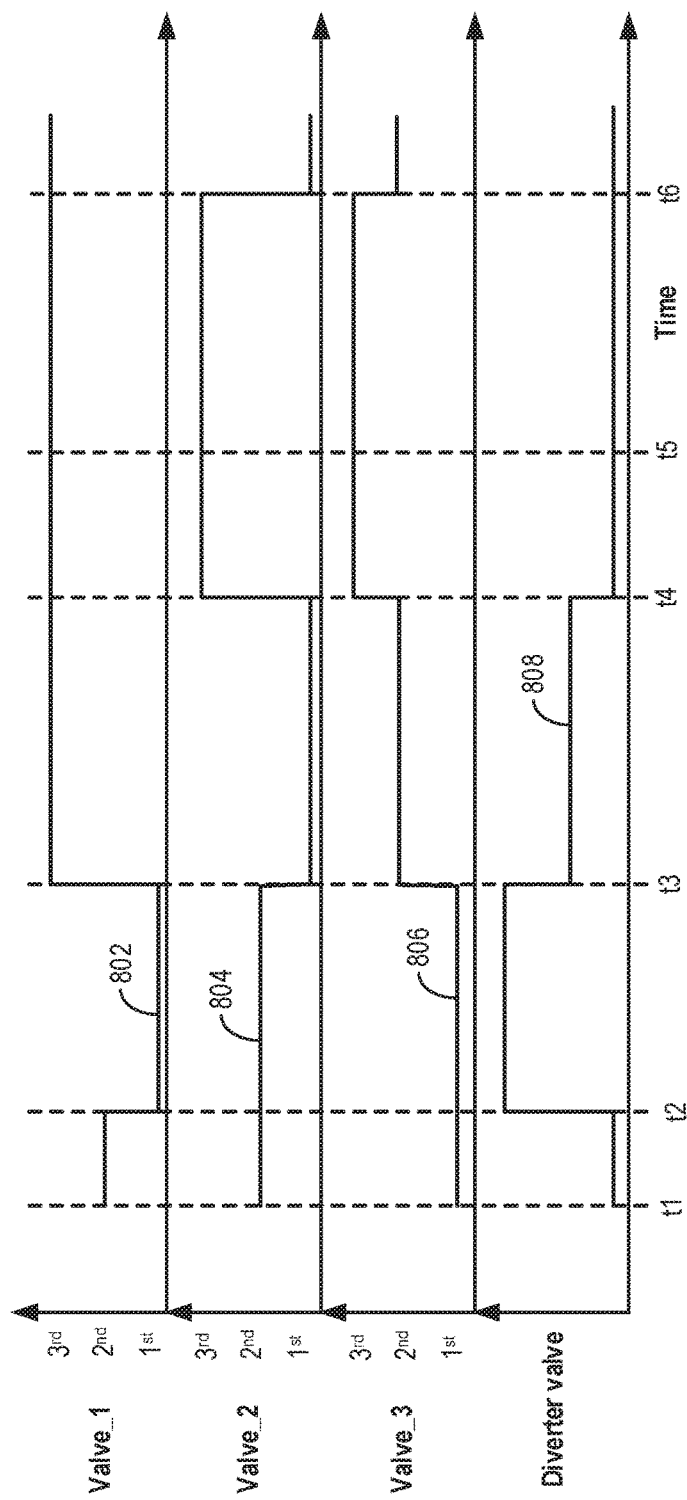
FIG. 8 shows example exhaust system valve settings to adjust exhaust flow through a split heat exchanger.

The following description relates to systems and methods for a split heat exchanger used for concurrent exhaust gas heat recovery and exhaust gas recirculation (EGR) cooling. Example embodiments of an engine system comprising an exhaust system with a split heat exchanger are shown at FIGS. 1-3. Different modes of operation of an example embodiment of the heat exchanger are shown at FIGS. 4A-4D and tabulated at FIG. 9. An engine controller may be configured to perform a control routine, such as the example routines of FIGS. 5 and 6, to vary the positions of one or more exhaust system valves to adjust exhaust flow and coolant flow through the exhaust system and coolant system of FIG. 1. An example operation of the exhaust system during different engine operating conditions is shown in FIGS. 7 and 8.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled, through charge-air cooler (CAC) 21 to throttle valve 20. Throttle valve 20 is coupled to engine intake manifold 22. From the compressor, the compressed air charge flows through the charge-air cooler 21 and the throttle valve to the intake manifold. In the embodiment shown in FIG. 1, the pressure of the air charge within the intake manifold is sensed by manifold air pressure (MAP) sensor 124.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator 92 may be actuated open to dump at least some exhaust pressure from upstream of the turbine to a location downstream of the turbine via wastegate 91. By reducing exhaust pressure upstream of the turbine, turbine speed can be reduced, which in turn helps to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one example, each of the exhaust and intake valves may be electronically actuated or controlled. In another example, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections may be directed to turbine 116 to drive the turbine. The combined flow from the turbine and the wastegate 91 then flows through emission control devices 172 and 174. In one example, the first emission control device 172 may be a light-off catalyst, and the second emissions control device 174 may be an underbody catalyst. Exhaust aftertreatment devices 172 and 174 may be configured to catalytically treat the exhaust flow, and thereby reduce an amount of one or more substances in the exhaust flow. For example, the exhaust after-treatment devices 172 and 174 may be configured to trap $NO_x$ from the exhaust flow when the exhaust flow is lean, and to reduce the trapped $NO_x$ when the exhaust flow is rich. In other examples, the exhaust after-treatment devices 172 and 174 may be configured to disproportionate $NO_x$ or to selectively reduce $NO_x$ with the aid of a reducing agent. In still other examples, the exhaust after-treatment devices 172 and 174 may be configured to oxidize residual hydrocarbons and/or carbon monoxide in the exhaust flow. Different exhaust after-treatment catalysts having any such functionality may optionally be arranged in wash coats in the exhaust after-treatment stages, either separately or together. In some embodiments, the exhaust after-treatment stages may include a regeneratable soot filter configured to trap and oxidize soot particles in the exhaust flow. All or part of the treated exhaust from the exhaust after-treatment devices 172 and 174 may be released into the atmosphere via main exhaust passage 102 after passing through a muffler 40.

An exhaust gas recirculation (EGR) delivery passage 180 may be coupled to the exhaust passage 102, upstream of the first exhaust after-treatment device 172 (and downstream of the turbine 116), to provide low pressure EGR (LP-EGR) to the engine intake manifold, upstream of compressor 114. A first three-way valve 162 may be coupled to the junction of the EGR delivery passage 180 and the main exhaust passage 102 to regulate exhaust flow through the EGR delivery passage. A first exhaust bypass passage 184 may be coupled to the main exhaust passage to route exhaust from upstream of the turbine 116 into the EGR delivery passage 180. A second three-way valve 163 may be coupled to the junction of the first bypass passage 184 and the EGR delivery passage 180 while a third three-way valve may be coupled to the junction of the main exhaust passage 102 and the first bypass passage 184. The first three-way valve 162 may be adjusted to flow exhaust from the first portion 182 of the EGR delivery passage 180 (between the first three-way valve 162 and the second three-way valve 163) to the main exhaust passage 102 or to flow exhaust from the main exhaust passage 102 to the first portion 182 of the EGR delivery passage 180. The second three-way valve 163 may be adjusted to flow exhaust from upstream of the turbine 116 to downstream of the turbine 116 via the first portion 182 of the EGR delivery passage 180. The second three-way valve 163 may also be adjusted to flow exhaust from upstream of the turbine to the intake manifold via the second portion 183 of the EGR delivery passage 180 (between the second three-way valve 163 and the intake passage 42). The third three-way valve 160 may be adjusted to flow the entire volume of exhaust from the main exhaust passage 102 to the first bypass passage 184. Also, the three-way valve 160 may be adjusted to flow a portion of exhaust from the main exhaust passage 102 to the first bypass passage 184 while flowing the remaining portion of exhaust to the turbine 116.

In another embodiment, the engine system may include a high pressure EGR flow path wherein exhaust is drawn from upstream of turbine 116 and recirculated to the engine intake manifold, downstream of compressor 114. A plurality of sensors may be coupled to the exhaust system 150 such as a first temperature sensor 128 may be coupled to the main exhaust passage 102 upstream of the first exhaust aftertreatment device 172, a second temperature sensor 124 may be coupled to the first portion 182 of the EGR delivery passage 180, and a third temperature sensor 126 may be coupled to the second portion 183 of the EGR delivery passage 180. Further, one or more sensors may be coupled to EGR passage 180 for providing details regarding the composition and condition of the EGR. For example, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an intake oxygen sensor.

A second bypass passage 140 of the exhaust system 150 may be coupled to the main exhaust passage 102, downstream of the second emission control device 173. The second bypass passage 140 may extend from downstream of the second emission control device 173 to upstream of muffler 40. A diverter valve 176, coupled to the junction of the main exhaust passage 102 and the second bypass passage 140, may be used to regulate a portion of exhaust flowing through the bypass passage 174. Depending on operating conditions such as engine temperature, the entire volume or a portion of the exhaust may be diverted through the second bypass passage 140 and thereon to tailpipe 35. The opening of the diverter valve 176 may be regulated to admit a desired first portion of exhaust into the second bypass passage 140 while the second (remaining) portion of exhaust may directly flow to the tailpipe 35. The ratio of the first portion to the second portion may be based on engine heating and vehicle cabin heating demands. The first portion may be increased relative to the second portion with an increase in at least one of engine heating and cabin heating demand.

A split (or branched) exhaust heat exchanger 135 may be fluidically coupled to each of the second portion 183 of the EGR delivery passage 180 and the bypass passage 174. Coolant from an engine coolant system 142 may enter the heat exchanger 135 via a switching valve 143. The heat exchanger 135 may comprise a common coolant inlet 137 which bifurcates into a first branch 136 and a second branch 138 at a first junction. The two branches 136 and 138 may rejoin at a second junction downstream of the first junction to form a common coolant outlet 139. The first branch 136 may be fluidically coupled to the second portion 183 of the EGR delivery passage 180 and the second branch 138 may be fluidically coupled to arm 141 of the second bypass passage 140. A coolant temperature sensor 190 may be coupled to the heat exchanger 135. Coolant may enter each of the first branch 136 and the second branch 138 of the heat exchanger 135 via the common coolant inlet 137 and flow simultaneously through each of the first branch and 136 the second branch 138, before combining at a common coolant outlet 139 and exiting the heat exchanger 135. The direction of coolant flow via the first branch may be same as the direction of coolant flow via the second branch.

As coolant simultaneously flows through the first branch 136 and the second branch 138, exhaust flowing through the EGR passage 180 and the bypass passage 174 may be cooled by heat transfer from the exhaust to the coolant streams. The direction of coolant flow via the first and second branch of the heat exchanger may be adjusted via adjustments to a position of the switching valve 143. Coolant may be routed simultaneously through each of the first branch 136 and the second branch 138 in a first direction (from coolant inlet 137 to coolant outlet 139) while exhaust flows through the EGR passage 180 and the second exhaust bypass passage 140 in a second direction (from the exhaust passage 102 into each of the EGR passage 180 and the second bypass passage 140) when the coolant temperature is lower than a threshold temperature; and coolant may be routed simultaneously through each of the first branch 136 and the second branch 138 in the second direction while exhaust flows through the EGR passage 180 and the exhaust bypass 140 in the second direction when the coolant temperature is higher than the threshold temperature, the first direction opposite to the second direction. Also, during conditions when a higher amount of exhaust cooling or exhaust heat recovery is required, coolant may be routed through the first and second branches 136 and 138 in a direction opposite to the direction of exhaust flow through second portion 183 of the EGR passage and arm 141 of the second bypass passage 140. In comparison, during conditions when a lower amount of cooling or exhaust heat recovery is required, coolant may be routed through the first and second branches 136 and 138 in the same direction as the direction of exhaust flow through second portion 183 of the EGR passage and arm 141 of the second bypass passage 140. Heated coolant exiting the common coolant outlet 139 may be routed through one or more of an engine block, a heater core, and a radiator based on engine heating demand relative to cabin heating demand.

In one example, a substantially equal amount of coolant may flow simultaneously through each of the first branch 136 and the second branch 138 at a substantially equal flow rate. In an alternate example, distinct amounts of coolant may flow simultaneously through each of the first branch and the second branch, such as a first amount and/or flow rate of coolant flowing through the first branch differing from a second amount and/or flow rate of coolant flowing simultaneously through the second branch. A ratio of the first amount relative to the second amount may be adjusted based on the first portion of exhaust flowing via the EGR passage (or EGR cooling demand) relative to the second portion of exhaust flowing via the bypass (or engine heating demand). The asymmetric flow of coolant through the first and second branches, when provided, may be enabled via a valve coupled upstream of the coolant inlet 137 and downstream of switching valve 143.

The exhaust system 150 may be operated in a first mode with the first three-way valve 162 in a second position, the second three-way valve 163 in a second position, and the third three-way valve 160 in a first position to contain exhaust within the exhaust manifold 36, the first bypass passage 184 and the first portion 182 of the EGR delivery passage 180. During operation in the first mode, exhaust may not be released to the atmosphere via the tailpipe, thereby reducing any tailpipe emissions. The exhaust system 150 may be operated in the first mode for a threshold duration after engine start during cold-start conditions when the temperature of the first and second after-treatment devices 172 and 174 are below their light-off temperatures. Details of operation of the exhaust system 150 in the first mode is described in relation to FIG. 4A.

The exhaust system 150 may be operated in a second mode with the first three-way valve 162 in a first position, the second three-way valve 163 in the second position, and the third three-way valve 160 in the first position to route the entire volume of exhaust from upstream of the turbine 116 to upstream of the first exhaust after-treatment device 172 via the first bypass passage 184 and the first portion 182 of the EGR delivery passage 180, bypassing the turbine 116. The heat from the exhaust may expedite attainment of light-off temperature for the exhaust after-treatment devices 172 and 174. The diverter valve 176 may be in an open position to route at least a portion of exhaust to the tailpipe 35 via the second bypass passage 140. Heat from the exhaust may be transferred to coolant flowing through the branch 138 of the heat exchanger 135. The recovered exhaust heat may be used for engine heating and/or vehicle cabin heating purposes. The exhaust system 150 may be operated in the second mode during cold-start conditions after the threshold duration for a threshold duration has elapsed (during which the exhaust system 150 is operated in the first mode). Details of operation of the exhaust system 150 in the second mode is described in relation to FIG. 4B.

The exhaust system 150 may be operated in a third mode with the first three-way valve 162 in a third position, the second three-way valve 163 in a first position, and the third three-way valve 160 in a second position to route a first portion of exhaust from upstream of the turbine 116 to the intake passage 42 via the first bypass passage 184 and the second portion 183 of the EGR delivery passage 180. The second (remaining) portion of exhaust may be routed directly to the first exhaust after-treatment device 172 via the turbine 116. The ratio of the first portion to the second portion of exhaust may be estimated based on the amount of EGR desired which in turn may be estimated based on engine operating conditions such as engine speed, engine load, engine temperature, etc. The diverter valve 176 may be in an open position to route a second portion of exhaust exiting the second exhaust after-treatment device 174 to the tailpipe via the second bypass passage 140 while a third portion of exhaust from upstream of the second exhaust after-treatment device 174 is routed to the tailpipe, directly, without flowing through the EGR passage 180 or the second bypass passage 140. A ratio of the second portion of exhaust to the third portion of exhaust may be based on an engine heating demand, the second portion increased relative to the third portion as the engine heating demand increases, and wherein an opening of the diverter valve may be based on the second portion relative to the third portion, the opening increased with an increase in the second portion relative to the third portion. Heat from the exhaust may be transferred to coolant flowing through each of the first branch 136 and the second branch 138 of the heat exchanger 135. The recovered exhaust heat may be used for engine heating and/or vehicle cabin heating purposes. The exhaust system 150 may be operated in the third mode after the activation of the exhaust after-treatment devices 172 and 174 (after attainment of respective light-off temperatures) and when the engine load is below a threshold engine load. As an example, once the exhaust after-treatment devices 172 and 174 are activated, a first portion of exhaust may be routed through the EGR passage 180 while a second portion of exhaust may be routed to the tailpipe 35 via the second exhaust bypass passage 140. The first portion of exhaust flowing through the EGR passage includes exhaust drawn from a main exhaust passage 102 based on engine load and delivered to an engine intake 22, upstream of a compressor 114, the first portion of exhaust drawn from upstream of a turbine 116 when the engine load is lower than a threshold, and drawn from downstream of the turbine when the engine load is higher than the threshold. Details of operation of the exhaust system 150 in the third mode is described in relation to FIG. 4C.

The exhaust system 150 may be operated in a fourth mode with the first three-way valve 162 in the third position, the second three-way valve 163 in a third position, and the third three-way valve 160 in a third position to route a first portion of exhaust of exhaust exiting the turbine 116 to the intake passage 42 via the first and second portions of the EGR delivery passage 180 while a second (remaining) portion of exhaust may be routed from the turbine 116 to the exhaust after-treatment devices 172 and 174. The ratio of the first portion to the second portion of exhaust may be estimated based on the amount of EGR desired. Based on passenger cabin heating demands, the diverter valve 176 may be opened to route a portion of exhaust exiting the second exhaust after-treatment devices 174 to the tailpipe via the second bypass passage 140. Heat from the exhaust may be transferred to a coolant flowing through the branch 138 of the heat exchanger 135 and the recovered exhaust heat may be used for vehicle cabin heating purposes. The exhaust system 150 may be operated in the fourth mode during higher than threshold engine load conditions when a higher degree of boost is desired. Details of operation of the exhaust system 150 in the third mode is described in relation to FIG. 4D.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas oxygen sensor 125 located upstream of the turbine 116, MAP sensor 124, exhaust system temperature sensors 128, 124, and 126, exhaust pressure sensor, compressor inlet temperature sensor 55, compressor inlet pressure sensor 56, compressor inlet humidity sensor 57, and engine coolant temperature sensor 190. Other sensors such as additional pressure, temperature, air/fuel ratio, and composition sensors may be coupled to various locations in engine system 100. The actuators 81 may include, for example, throttle 20, first three-way valve 162, second three-way valve 163, third three-way valve 160, diverter valve 176, switching valve 143, wastegate 92, and fuel injector 66. The control system 14 may include a controller 12. The controller 12 may receive input data from the various sensors, process the input data, and trigger various actuators in response to the processed input data based on instruction or code programmed therein corresponding to one or more routines. In one example, based on engine operating conditions such as exhaust temperature, engine speed, and engine load, the controller 12 may send a signal to each of the first three-way valve 162, second three-way valve 163, third three-way valve 160 to adjust exhaust flow via the turbine 116, the exhaust after-treatment devices 172 and 174, and to the intake manifold (as EGR). In another example, based on coolant temperature, the controller 12 may send a signal to the switching valve 143 to adjust the direction of coolant flow through each branch of the heat exchanger 135. In a further example, based on engine operating conditions and exhaust heat recovery demands, the controller 12 may send a signal to adjust the position of the diverter valve 176 to route exhaust via the bypass passage 140 for exhaust heat recovery via the coolant flowing through the heat exchanger 135. Example control routines for exhaust flow regulation are described with regard to FIGS. 5-6.

FIG. 4A further elaborates the exhaust system introduced in FIG. 1 and shows an example embodiment 400 of operating the exhaust system of FIG. 1 in a first operating mode. In one example, the exhaust system 150 is the exhaust system 150 of FIG. 1 and therefore may share common features and/or configurations as those already described in FIG. 1. Components previously described in FIG. 1 are numbered similarly and not reintroduced.

As seen in FIG. 4A, a first exhaust bypass passage 184 may be coupled main exhaust passage upstream of the turbine 116 to route exhaust from upstream of the turbine 116 to the EGR delivery passage 180. The EGR delivery passage 180 may be coupled to the main exhaust passage 102 downstream of the turbine 116. A first three-way valve 162 may be coupled to the junction of the EGR delivery passage 180 and the main exhaust passage 102 to regulate exhaust flow from the main exhaust passage 102 to the first portion 182 of the EGR delivery passage 180 and also from the first portion 182 of the EGR delivery passage 180 to the main exhaust passage 102. A second three-way valve 163 may be coupled to the junction of the first bypass passage 184 and the position of the second three-way valve may be adjusted to flow exhaust from upstream of the turbine 116 to downstream of the turbine 116 via the first portion 182 of the EGR delivery passage 180 or to flow exhaust from upstream of the turbine 116 to the intake manifold via the second portion 183 of the EGR delivery passage 180. A third three-way valve may be coupled to the junction of the main exhaust passage 102 and the first bypass passage 184 to regulate exhaust flow from the main exhaust passage 102 (from upstream of the turbine 116) to the first bypass passage 184.

Downstream of the second exhaust after-treatment device 174, a second bypass passage 140 may be coupled to the main exhaust passage 102. The second bypass passage 140 may comprise an inlet pipe 440 and an outlet pipe 442. The inlet pipe 440 (herein also referred to as arm 141) may originate from the main exhaust passage at junction 132 and the outlet pipe 442 may rejoin the main exhaust passage 102 at junction 133, downstream of the junction 132. The inlet pipe 440 and the outlet pipe 442 may be substantially parallel to each other. A diverter valve 176 may be coupled to the main exhaust passage 102, between the junctions 132 and 133 to regulate exhaust flow through the bypass passage. The opening of the diverter valve may be regulated to flow a first portion of exhaust to the tailpipe via the bypass passage 140 while flowing a second portion of exhaust directly to the tailpipe. The ratio of the first portion of exhaust to the second portion of exhaust may be based on an engine heating demand, the first portion increased relative to the second portion as the engine heating demand increases (such as during cold-start conditions when the engine is cold and the exhaust catalysts are below their respective light-off temperatures), and the opening of the diverter valve may be increased with an increase in the first portion relative to the second portion. Similarly, the first portion may be decreased relative to the second portion as the engine heating demand decreases (such as when the engine temperature has reached an optimal temperature and the exhaust catalysts have achieved their respective light-off temperatures, during engine idling etc.), and the opening of the diverter valve may be decreased with a decrease in the first portion relative to the second portion.

A heat exchanger 135 may comprise a common coolant inlet 137, a first branch 136, a second branch 138, and a common coolant outlet 139. The first branch 136 may be fluidically coupled to the second portion 183 of the EGR delivery passage 180 and the second branch 138 may be fluidically coupled to the inlet pipe 440 of the bypass passage 140.

FIG. 4A shows operation of the heat exchanger system 135 in a first mode. In the first mode, the third three-way valve 160 may be actuated to a first position to enable the entire volume of exhaust to enter the first bypass passage 184. The second three-way valve may be actuated to a second position to enable exhaust from the first bypass passage 184 to flow to the first portion 182 of the EGR delivery passage. The first three-way valve 162 may be actuated to a second position to disable exhaust flow from the first portion 182 of the EGR delivery passage back to the main exhaust passage 102. Therefore, the hot exhaust may be confined within the exhaust manifold, the first bypass passage 184, and the first portion 182 of the EGR delivery passage and exhaust may not be released to the atmosphere via the tailpipe. In this mode, as the exhaust does not flow through the turbine, exhaust thermal energy loss at the turbine may be reduced. The diverter valve may be maintained in the closed position as there is no exhaust flow via the main exhaust passage (downstream of the turbine) that may be leveraged for exhaust heat recovery. As there is no exhaust flow via the second portion 183 of the EGR delivery passage and the inlet pipe 440, heat transfer may not take place to coolant flowing through each of the first and second branch of the heat exchanger 135. Therefore, coolant may be routed in one of a first direction and a second direction based on a default (or previous) position of the switching valve (such as switching valve 143 in FIG. 1). In the first direction, coolant may enter the heat exchanger 135 via the coolant inlet 137, simultaneously flow through each of the two branches 136 and 138, and then exit the heat exchanger via the coolant outlet 139, whereas in the second direction, coolant may enter the heat exchanger 135 via the coolant outlet 139, simultaneously flow through each of the two branches 136 and 138, and then exit the heat exchanger via the coolant inlet 137.

The exhaust system 150 may be operated in the first mode during cold-start conditions for a threshold duration immediately after engine start. During this time, the temperature of the first and second after-treatment devices 172 and 174 may be below their respective light-off temperatures. By reducing tailpipe emissions immediately after engine cold-start, emissions quality may be improved. By storing the hot exhaust in the exhaust manifold, the first bypass passage 184, and the first portion 182 of the EGR delivery passage for a threshold duration, thermal energy from this exhaust may be subsequently used (during operation of the exhaust system in the second mode) for warm-up of the first and second after-treatment devices 172 and 174. In one example, the threshold duration when the engine is operated in the first mode immediately after a cold-start is one second.

FIG. 4B shows an example embodiment 420 of operating the exhaust system 150 of FIG. 1 in a second operating mode. In the second mode, the third three-way valve 160 may be actuated to the first position to enable the entire volume of exhaust to enter the first bypass passage 184. The second three-way valve may be actuated to the second position to enable exhaust from the first bypass passage 184 to flow to the first portion 182 of the EGR delivery passage. The first three-way valve 162 may be actuated to a first position to enable exhaust flow from the first portion 182 of the EGR delivery passage back to the main exhaust passage 102. In this way, exhaust may be routed from upstream of the turbine 116 to downstream of the turbine 116 via the first bypass passage 184 and the first portion 182 of the EGR delivery passage, bypassing the turbine 116. The hot exhaust may be routed via the first and second after-treatment devices 172 and 174, wherein exhaust thermal energy may be used to attain the light-off temperatures of the devices 172 and 174. The diverter valve 176 may be in a fully open position to divert exhaust exiting the second after-treatment device 174 into the second bypass passage 140. The exhaust may enter the inlet pipe 440 at junction 132 and return to the main exhaust passage 102 at junction 133 via the outlet pipe 442. The exhaust may then be released to the atmosphere via the tailpipe.

Coolant may enter the heat exchanger 135 via the coolant inlet 137, simultaneously flow through each of the two branches 136 and 138 in a first direction (from the coolant inlet 137 to the coolant outlet 139), and then exit the heat exchanger via the coolant outlet 139. As coolant flows from the coolant inlet 137 to the coolant outlet 139, the coolant flow may be equally divided between the two branches 136 and 138. During operation in this mode, exhaust may flow through the inlet pipe 440 of the bypass passage 140 in a second direction (from the exhaust passage 102 into the inlet pipe 440). Heat from the exhaust flowing in the second direction (shown by dashed lines) through the first pipe 440 may be transferred to the coolant flowing (solid lines) in the first direction through the second branch 138 of the heat exchanger. Due to the opposite directions of flow between the coolant and exhaust in the inlet pipe 440, a higher degree of heat transfer may take place from the exhaust to the coolant. The warmed coolant exiting the heat exchanger via the coolant outlet 139 may then be circulated back to the engine and/or through a heater core for heating a vehicle cabin based on engine heating and cabin heating demands. Coolant may be routed through the heat exchanger in the first direction when the coolant temperature is below a threshold temperature with a higher than threshold margin between the coolant temperature and the threshold temperature and a higher degree of heat transfer from the exhaust may not cause overheating of the coolant. As such, coolant may be simultaneously routed through each of the first branch and the second branch in the first direction until the coolant temperature reaches the threshold temperature, and then coolant may be routed through each of the first branch and the second branch in the second direction.

The exhaust system 150 may be operated in the second mode during cold-start conditions after the threshold duration has elapsed following engine start. During the threshold duration, the exhaust system 150 may be operated in the first mode and then transitioned to operation in the second mode until the first and second after-treatment devices 172 and 174 have attained their respective light-off temperatures. The hot exhaust stored in the exhaust manifold, the first bypass passage 184, and the first portion 182 of the EGR delivery passage during operation in the first mode may be routed to the devices 172 and 174 upon transition to operation in the second mode. As the exhaust is routed to the devices 172 and 174 bypassing the turbine 116, loss of thermal energy at the turbine 116 may be reduced.

Figure 4C:
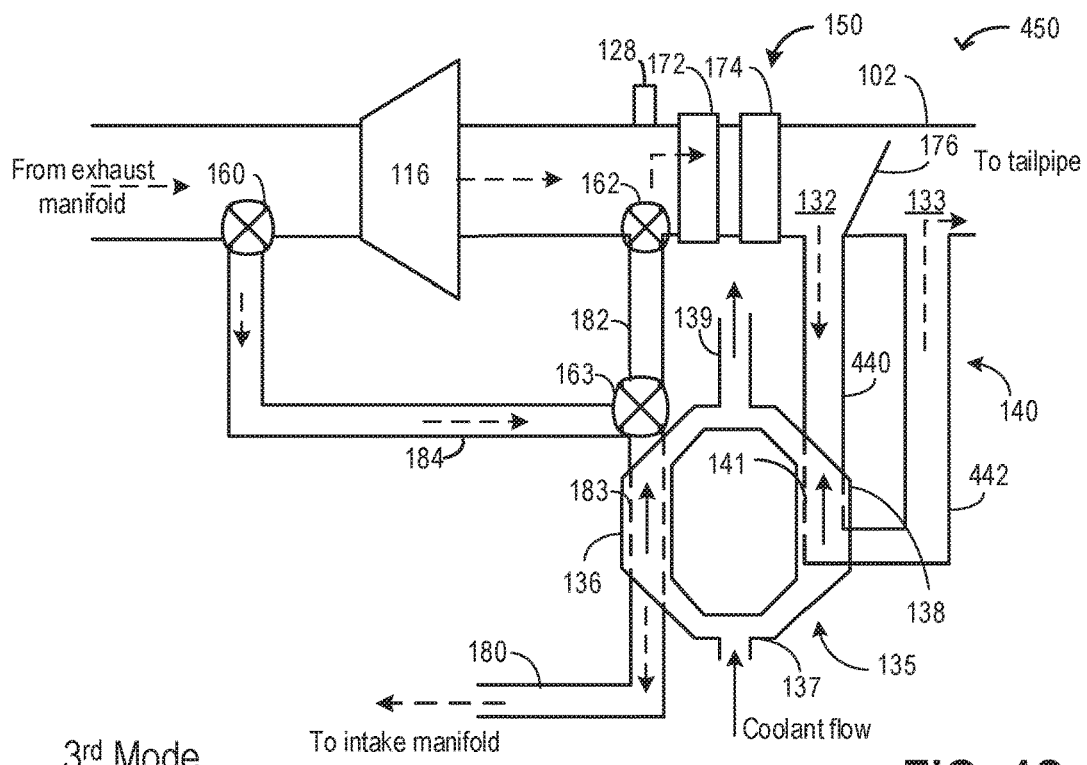
FIG. 4C shows the first example embodiment of the split heat exchanger of FIG. 1, operating in a third mode.

FIG. 4C shows an example embodiment 450 of operating the exhaust system 150 of FIG. 1 in a third operating mode. In the third mode, the third three-way valve 160 may be actuated to a second position to enable a first portion of exhaust to enter the first bypass passage 184 while a second (remaining) portion of exhaust may flow directly to the first after-treatment devices 172 via the turbine 116. The second three-way valve 163 may be actuated to a first position to enable exhaust from the first bypass passage 184 to flow to the intake manifold via the second portion 183 of the EGR delivery passage. The ratio of the first portion of exhaust (delivered as EGR) to the second portion of exhaust (directly routed to after-treatment devices) may be determined based on a desired EGR level. EGR may be requested to attain a desired engine dilution, thereby improving fuel efficiency and emissions quality. An amount of EGR requested may be based on engine operating conditions including engine load, engine speed, engine temperature, etc. For example, the controller may refer a look-up table having the engine speed and load as the input, and having a signal corresponding to a degree of opening to apply to the EGR valve as the output, the degree of opening providing a dilution amount corresponding to the input engine speed-load. In another example, the controller may rely on a model that correlates the change in engine load with a change in the engine's dilution requirement, and further correlates the change in the engine's dilution requirement with a change in the EGR requirement. For example, as engine load increases from a low load to a mid-load, EGR requirement may increase, and then as engine load increases from a mid-load to a high load, EGR requirement may decrease. The opening of the third three-way valve 160 may be adjusted based on the ratio of the first portion to the second portion, the opening increased with an increase in the first portion relative to the second portion and the opening decreased with a decrease in the first portion relative to the second portion.

Due to the first position of the second three-way valve 163, exhaust from the first bypass passage 184 may not enter the first portion 182 of the EGR delivery passage and may only enter the second portion 183 of the EGR delivery passage. The first three-way valve 162 may be actuated to a third position to disable exhaust flow from the main exhaust passage 102 to the first portion 182 of the EGR delivery passage. The second portion of exhaust may be routed via the first and second after-treatment devices 172 and 174, wherein exhaust thermal energy may be used to maintain the temperatures of the devices 172 and 174 above their respective light-off temperatures. The diverter valve 176 may be in a partially open position to divert at least a portion (third portion) of exhaust exiting the second after-treatment device 174 into the second bypass passage 140 while a remaining (fourth) portion of exhaust may directly flow to the tailpipe. The third portion of exhaust may enter the inlet pipe 440 at junction 132 and return to the main exhaust passage 102 at junction 133 via the outlet pipe 442. The third and fourth portions of exhaust may then be released to the atmosphere via the tailpipe. The ratio of the third portion to the fourth portion may be based on engine heating and vehicle cabin heating demands. In one example, the third portion may be increased while the fourth portion may be correspondingly decreased as the demand for engine heating and/or vehicle cabin heating increases. In another example, the third portion may be decreased while the fourth portion may be correspondingly increased as the demand for engine heating and/or vehicle cabin heating decreases. The opening of the diverter valve 176 may be adjusted based on the ratio of the third portion to the fourth portion, the opening increased as the third portion increases and the opening decreased as the third portion decreases. In one example, when the engine temperature and vehicle cabin temperature reaches their respective threshold, further exhaust heat recovery may not be desired and consequently, the diverter valve may be actuated to a closed position to route the entire volume of exhaust exiting the second after-treatment device 174 directly to the tailpipe.

The first portion of exhaust flowing to the intake manifold via the second portion 183 of the EGR delivery passage and the third portion of exhaust flowing though the inlet pipe 440 may be cooled by coolant flowing through each of the first branch 136 and the second branch 138 of the heat exchanger 135, respectively. Coolant may enter the heat exchanger 135 via the coolant inlet 137, simultaneously flow through each of the two branches 136 and 138 in a first direction (from the coolant inlet 137 to the coolant outlet 139), and then exit the heat exchanger via the coolant outlet 139. During operation in this mode, exhaust may flow through each of the second portion 183 of the EGR delivery passage and the inlet pipe 440 of the bypass passage 140 in the second direction (from the exhaust passage 102 into the EGR delivery passage and the inlet pipe). Due to the opposite directions of flow between the coolant (flowing through each of the first and second branch of the heat exchanger) and exhaust (flowing through the second portion of the EGR delivery passage and the inlet pipe), a higher degree of heat transfer may take place from the exhaust to the coolant. The warmed coolant exiting the heat exchanger via the coolant outlet 139 may then be circulated back to the engine and/or through a heater core for heating a vehicle cabin based on engine heating and cabin heating demands.

Coolant may be routed through the heat exchanger in the first direction when the coolant temperature is below a threshold temperature with a higher than threshold margin between the coolant temperature and the threshold temperature and a higher degree of heat transfer from the exhaust may not cause overheating of the coolant. However, if the margin between the coolant temperature and the threshold temperature decreases to below the threshold, further heat transfer to the coolant may be reduced to lower the possibility of coolant overheating. Therefore, if the margin between the coolant temperature and the threshold temperature decreases to below the threshold, the direction of coolant flow via the heat exchanger may be revered via adjustments to a switching valve. Coolant may enter the heat exchanger 135 via the coolant outlet 139, simultaneously flow through each of the two branches 136 and 138 in a second direction (from the coolant outlet 139 to the coolant inlet 137), and then exit the heat exchanger via the coolant inlet 137. Due to the parallel directions of flow between the coolant (flowing through each of the first and second branch of the heat exchanger in the second) and exhaust (flowing through the second portion of the EGR delivery passage and the inlet pipe in the second), a lower degree of heat transfer may take place from the exhaust to the coolant. However, if the coolant temperature increases to above the threshold temperature, exhaust flow via the second portion 183 of the EGR passage and the second bypass passage 140 may be suspended to reduce further heat transfer to the coolant flowing through the heat exchanger 135.

The exhaust system 150 may be operated in the third mode when EGR is requested to achieve a desired engine dilution such as after the activation of the exhaust after-treatment devices 172 and 174 (after attainment of respective light-off temperatures) and when the engine load is below a threshold engine load. By flowing exhaust from upstream of the turbine 116, a warmer EGR may be supplied to the intake manifold 22. Therefore, the exhaust system 150 may be operated in the third mode when warmer EGR is requested for engine operations.

Figure 4D:
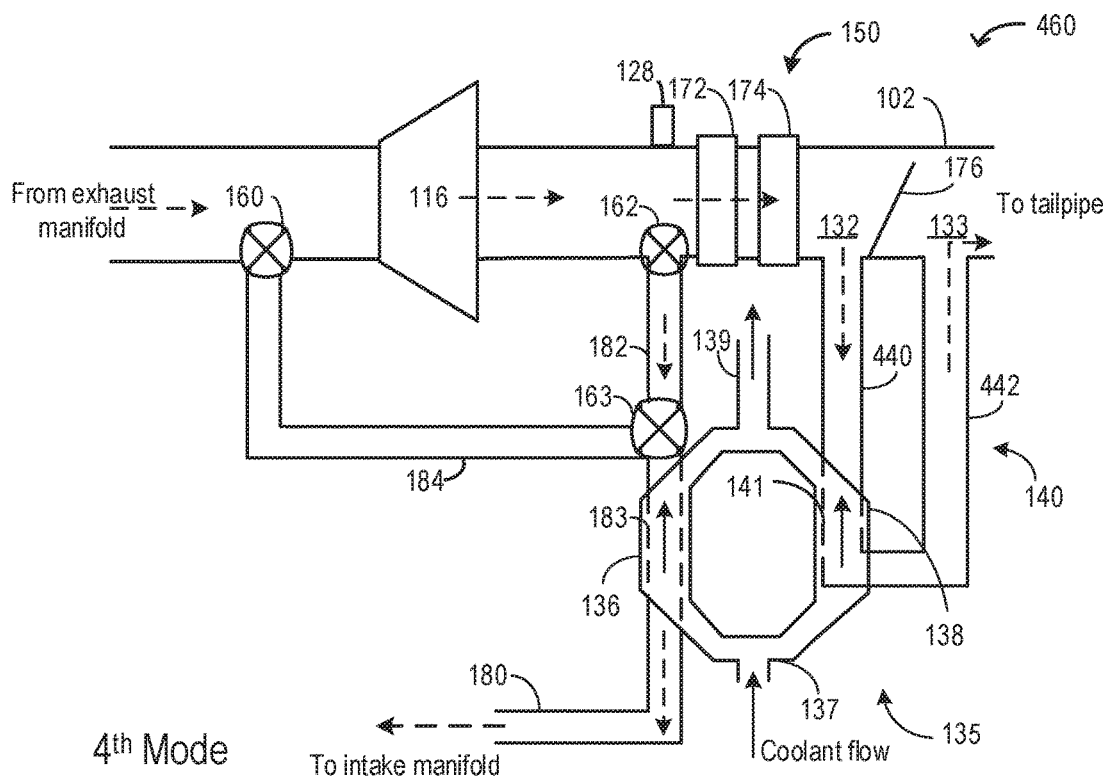
FIG. 4D shows the first example embodiment of the split heat exchanger of FIG. 1, operating in a fourth mode.

FIG. 4D shows an example embodiment 460 of operating the exhaust system 150 of FIG. 1 in a fourth operating mode. In the fourth mode, the third three-way valve 160 may be actuated to a second position to disable exhaust flow from the main exhaust passage 102 into the first bypass passage 184. Therefore, the entire volume of exhaust may flow through the turbine 116. The first three-way valve 162 may be actuated to a third position to enable a first portion of exhaust to enter the first portion 182 of the EGR delivery passage 180 while a second portion of exhaust may continue to flow downstream via the main exhaust passage (to the first after-treatment device 172). The ratio of the first portion of exhaust (delivered as EGR) to the second portion of exhaust (directly routed to after-treatment devices) may be determined based on a desired EGR level. As discussed earlier, the controller may determine the desired EGR level based on engine operating conditions such as engine temperature, engine load, and engine speed. The opening of the valve 162 may be adjusted based on the ratio of the first portion to the second portion, the opening increased with an increase in the first portion and the opening decreased with a decrease in the first portion. The second three-way valve may be actuated to a third position to enable exhaust from the first portion 182 of the EGR delivery passage to flow to the intake manifold via the second portion 183 of the EGR delivery passage. Due to the third position of the second three-way valve 163, exhaust from the EGR delivery passage 180 may not enter the first bypass passage 184. In one example, during operation in the fourth mode, EGR may not be requested for engine operations, and the opening of the first three-way valve 162 may be adjusted to disable exhaust flow from the main exhaust passage 102 into the EGR delivery passage 180.

If exhaust heat recovery is requested for vehicle cabin heating purposes, the diverter valve 176 may be actuated to a partially open position to divert at least a portion (third portion) of exhaust exiting the second after-treatment device 174 into the second bypass passage 140 while a remaining (fourth) portion of exhaust may directly flow to the tailpipe. The third portion of exhaust may enter the inlet pipe 440 at junction 132 and return to the main exhaust passage 102 at junction 133 via the outlet pipe 442. The third and fourth portions of exhaust may then be released to the atmosphere via the tailpipe. The ratio of the third portion to the fourth portion may be based on vehicle cabin heating demands. In one example, the third portion may be increased while the fourth portion may be correspondingly decreased as the demand for vehicle cabin heating increases. In another example, the third portion may be decreased while the fourth portion may be correspondingly increased as the demand for vehicle cabin heating decreases. The opening of the diverter valve 176 may be adjusted based on the ratio of the third portion to the fourth portion, the opening increased as the third portion increases and the opening decreased as the third portion decreases. In one example, when further exhaust heat recovery is not desired the diverter valve may be actuated to a closed position to route the entire volume of exhaust exiting the second after-treatment device 174 directly to the tailpipe.

The first portion of exhaust flowing to the intake manifold via the second portion 183 of the EGR delivery passage and the third portion of exhaust flowing though the inlet pipe 440 may be cooled by coolant flowing through each of the first branch 136 and the second branch 138 of the heat exchanger 135, respectively. During operation in this mode, exhaust may flow through each of the second portion 183 of the EGR delivery passage and the inlet pipe 440 of the bypass passage 140 in the second direction (from the exhaust passage 102 into the EGR delivery passage and the inlet pipe). Due to the opposite directions of flow between the coolant (flowing through each of the first and second branch of the heat exchanger) and exhaust (flowing through the second portion of the EGR delivery passage and the inlet pipe), a higher degree of heat transfer may take place from the exhaust to the coolant. The warmed coolant exiting the heat exchanger via the coolant outlet 139 may then be circulated back to the engine and/or through a heater core for heating a vehicle cabin based on engine heating and cabin heating demands.

Coolant may be routed through the heat exchanger in the first direction when the coolant temperature is below a threshold temperature with a higher than threshold margin between the coolant temperature and the threshold temperature and a higher degree of heat transfer from the exhaust may not cause overheating of the coolant. However, if the margin between the coolant temperature and the threshold temperature decreases to below the threshold, in order to reduce heat transfer to the coolant, the direction of coolant flow via the heat exchanger may be revered by adjusting the switching valve.

The exhaust system 150 may be operated in the fourth mode when the engine load is higher than the threshold engine load causing a higher demand for boost pressure. By routing the entire volume of exhaust via the turbine 116, a desired boost pressure may be delivered.

The four example modes of operation of the heat exchange systems of FIG. 1 as discussed above are tabulated in FIG. 9. Line 902 of table 900 shows exhaust valve settings corresponding to the operation of the exhaust system operating in the first mode as described in FIG. 4A, line 904 shows exhaust valve settings corresponding to the operation of the exhaust system operating in the second mode as described in FIG. 4B, line 906 shows exhaust valve settings corresponding to the operation of the exhaust system operating in the third mode as described in FIG. 4C, and line 908 shows exhaust valve settings corresponding to the operation of the exhaust system operating in the first mode as described in FIG. 4D.

An alternate embodiment of the engine exhaust system of FIG. 1 is shown in FIG. 2 and elaborated below with reference to example engine system 200. All components of the engine system 200 may be identical to that of engine system 100 other than the heat exchanger 145. Components previously introduced in FIG. 1 are numbered similarly and not reintroduced. Similar to the embodiment of FIG. 1, engine system 200 of FIG. 2 may further include control system 14 for controlling engine operations. The engine system 200 of FIG. 2 may be operated in each of the modes of operation of the engine exhaust system of FIG. 1 as described in relation to FIGS. 4A-4D.

In FIG. 2, engine system 200 includes a heat exchanger 145 coupled to each of the EGR delivery passage 180 and the exhaust bypass passage 140. Herein, instead of distinct branches, the heat exchanger 145 may be configured as a loop with a first section 146 of the loop fluidically coupled to the first portion 182 of the EGR delivery passage 180 and a second section 148 of the loop fluidically coupled to arm 141 of the second exhaust bypass passage 140. The entire volume of coolant entering the heat exchanger 145 may sequentially flow through both sections of the heat exchanger 145 wherein heat from the first portion of exhaust flowing through the EGR delivery passage and the second portion of exhaust flowing through the bypass passage may be transferred, sequentially, to the coolant. By adjusting an order of coolant flow through the looped heat exchanger, an order of cooling the exhaust in EGR delivery passage 180 and second exhaust bypass passage 140 may be varied. In heat exchanger 145, a direction of coolant flow through the first section 146 is opposite to the direction of coolant flow through the second section 148. The order of sequential coolant flow through each of the first section and the second section of the heat exchanger may be adjusted based on each of an EGR cooling demand and an engine heating demand. The EGR cooling demand may be based on the first portion of exhaust delivered as EGR, the EGR cooling demand increasing with an increase in the first portion of exhaust. Similarly, the engine cooling demand may be based on the second portion of exhaust diverted via the bypass passage, the engine cooling demand increasing with an increase in the second portion of exhaust. As such, the order of sequential coolant flow through the first and second sections may be varied based on the first portion relative to the second portion. During a higher than threshold engine load, opening of the first three-way valve 162 coupled to the exhaust passage 102, downstream of a turbine 116, may be adjusted to flow exhaust from downstream of the turbine 116 to an engine intake 22, and during a lower than threshold engine load, adjusting opening of the first three-way valve 162 coupled to the exhaust passage, upstream of the turbine, may be adjusted to flow exhaust from upstream of the turbine to the engine intake, an opening of the first three-way valve 162 or the first three-way valve 162 increasing as the engine dilution demand increases.

In one example, the coolant may be routed from the inlet 247 to the first section 146 and then to the second section before exiting the coolant loop via outlet 249. During this first order of coolant flow, coolant is routed via the first section 146 of the heat exchanger 145 in a first direction (from a first end of the first section proximal to the switching valve 143 to a second end of the first section proximal to the exhaust passage 102) and then via the second section 148 in a second direction, opposite the first direction (from a second end of the second section proximal to the exhaust passage 102 to a first end of the second section proximal to the switching valve 143) while exhaust flows through each of first portion 182 of the EGR passage 180 and arm 141 of the bypass passage 140 in the second direction (from the exhaust passage 102 into the EGR passage 180 and the bypass passage 140). The switching valve 143 may be actuated to a first position to enable coolant flow in the first order. The entire volume of coolant (flowing in opposite direction to exhaust flowing through the EGR passage 180) may collect heat first from exhaust flowing through the EGR delivery passage 180 and then from exhaust flowing through the bypass passage 140 (coolant flowing parallel to direction of exhaust flow through bypass passage). The warmed coolant may then be circulated back to the engine (such as when engine heating is required) and/or through a heater core for heating a vehicle cabin (such as when cabin heating is requested). As such, coolant may be routed in the first order when the first portion of exhaust is larger than the second portion of exhaust (such as when EGR cooling demand is higher than engine cooling demand).

In another example, the switching valve 143 may be actuated to a second position to flow coolant though the heat exchanger 145 in a second order with coolant being routed from the outlet 249 to the second section 148 of the heat exchanger 145 in the first direction and then via the first section 146 in the second direction before exiting the coolant loop via inlet 247 while exhaust flows through each of the EGR passage 180 and the second bypass passage 140 in the second direction. The entire volume of coolant (flowing in opposite direction to exhaust flowing through the bypass passage 140) may collect heat first from exhaust flowing through the arm 141 of the second bypass passage 140 and then from exhaust flowing through the first portion 182 of the EGR passage 180 (coolant flowing parallel to direction of exhaust flow through EGR passage). The warmed coolant may then be circulated back to the engine and/or through a heater core for heating a vehicle cabin. As such, coolant may be routed in the second order, when the second portion of exhaust is larger than the first portion of exhaust (such as when EGR cooling demand is lower than engine cooling demand).

In this way, a first portion of exhaust may be diverted from an exhaust passage 102 into an EGR passage 180, a second portion of exhaust may be diverted from the exhaust passage 102 into an exhaust bypass 140, heat may be transferred from the first portion of exhaust to coolant flowing through a first section 146 of a branched heat exchanger, heat may be transferred from the second portion of exhaust to coolant flowing through a second section 148 of the heat exchanger 145, and coolant flow through the first and second sections may be varied based on the first portion relative to the second portion.

An alternate embodiment of FIG. 2 is shown in FIG. 3 and elaborated below with reference to example engine system 300. All components of the engine system 300 may be identical to that of engine system 200 other than the exhaust system 150. Components previously introduced in FIG. 2 are numbered similarly and not reintroduced. Similar to the embodiment of FIG. 2, engine system 300 of FIG. 3 may further include control system 14 for controlling engine operations. The engine system 300 of FIG. 3 may be operated in each of the modes of operation of the engine exhaust system of FIG. 1 as described in relation to FIGS. 4A-4D.

As seen in FIG. 3, a main exhaust gas recirculation (EGR) delivery passage 180 may be coupled to the exhaust passage 102 upstream of the first exhaust after-treatment device 172 (downstream of the turbine 116), to provide low pressure EGR (LP-EGR) to the engine intake manifold, upstream of compressor 114. A first bypass passage may be coupled to each of the main exhaust passage, upstream of the turbine 116 and the main EGR passage 180. A first three-way valve 162 may be coupled to the main EGR delivery passage 180 to regulate exhaust flow into the main EGR delivery passage 180 from the main exhaust passage 102. A second three-way valve 163 may be coupled to the junction of the first bypass passage 184 and the main EGR delivery passage 180. A third three-way valve 160 may be coupled to the junction of the first bypass passage 184 and the main exhaust passage 102 to regulate exhaust flow into the first bypass passage 184 from the main exhaust passage 102. The portion of the main EGR delivery passage between the first three-way valve 162 and the second three-way valve 163 may be termed as the first portion 182 of the EGR delivery passage while the portion between the second three-way valve 163 and the intake manifold may be termed as the second portion 183 of the EGR delivery passage 180. A second EGR passage 157 may be coupled to each of the second bypass passage 140, upstream of the region of the second bypass passage 140 that couples with the heat exchanger 155, and the main EGR delivery passage 180 downstream of the first three-way valve 162 and upstream of the second three-way valve 163. A fourth three-way valve 165 may regulate exhaust flow from the bypass passage to the main EGR delivery passage 180 via the second EGR passage 157. In this way, EGR delivered to the intake manifold via the main EGR passage 180 may also be sourced from downstream of the second exhaust after-treatment device 174 and upstream of the diverter valve 176.

Engine system 200 includes a heat exchanger 155 coupled to each of the second portion 183 of the main EGR delivery passage 180 and an arm 141 the exhaust bypass passage 140. The heat exchanger 155 may be identical to the heat exchanger 145 as discussed in FIG. 2. By adjusting the position of the switching valve 143, coolant flow via the heat exchanger in each of a first order and a second order as described with relation to FIG. 2. In the first order, coolant may first flow through the first section 156 of the heat exchanger 155 and then through the second section 158, in the second order, coolant may first flow through the second section 158 and then through the first section 156, and in the third mode, coolant flow through the heat exchanger 155 may be suspended. An order of coolant flow through the first and second sections may be based on the combined exhaust flow via the EGR passage 180 and the amount of exhaust flow via the bypass passage. The first order may be selected when the exhaust flow via the EGR passage 180 is higher than the exhaust flow via the bypass passage and the second mode may be selected when the exhaust flow via the bypass passage is higher than the exhaust flow via the EGR passage 180.

In this way, the systems of FIGS. 1, 2, 3, and 4A-4D provide for an intake manifold, an engine exhaust system including an exhaust passage and an exhaust catalyst, a turbocharger including a turbine coupled to the exhaust passage and a compressor coupled to the intake manifold, an EGR passage with a first valve for recirculating exhaust from the exhaust passage, upstream of the catalyst, to the intake manifold, a first exhaust bypass coupling the exhaust passage, from upstream of the turbine, to the EGR passage, a second valve coupled to a junction of the first exhaust bypass and the EGR passage, and a third valve coupled to a junction of the first exhaust bypass and the exhaust passage, a second exhaust bypass coupling the exhaust passage from downstream of the catalyst to upstream of a tailpipe via a diverter valve, a temperature sensor coupled to the exhaust passage, upstream of the catalyst, for estimating an exhaust temperature, a heat exchanger with a coolant inlet bifurcating into a first branch and a second branch, the first branch and the second branch rejoining at a coolant outlet, the first branch fluidically coupled to an arm of the EGR passage and the second branch fluidically coupled to an arm of the bypass passage, a coolant system with a coolant temperature sensor and a switching valve, the coolant system fluidically coupled to each of the heat exchanger, an engine block, and a heater core. The system may further include a controller with computer readable instructions stored on non-transitory memory for: in response to a lower than threshold coolant temperature, actuating the switching valve to a first position to simultaneously flow coolant through each of the first branch and the second branch of the heat exchanger in a first direction, and transferring heat from exhaust flowing through the arm of the EGR passage in a second direction to coolant flowing through the first branch in the first direction, and from exhaust flowing through the arm of the bypass passage in the second direction to coolant flowing through the second branch of the heat exchanger in the first direction, the first direction opposite to the second direction.

Figure 5:
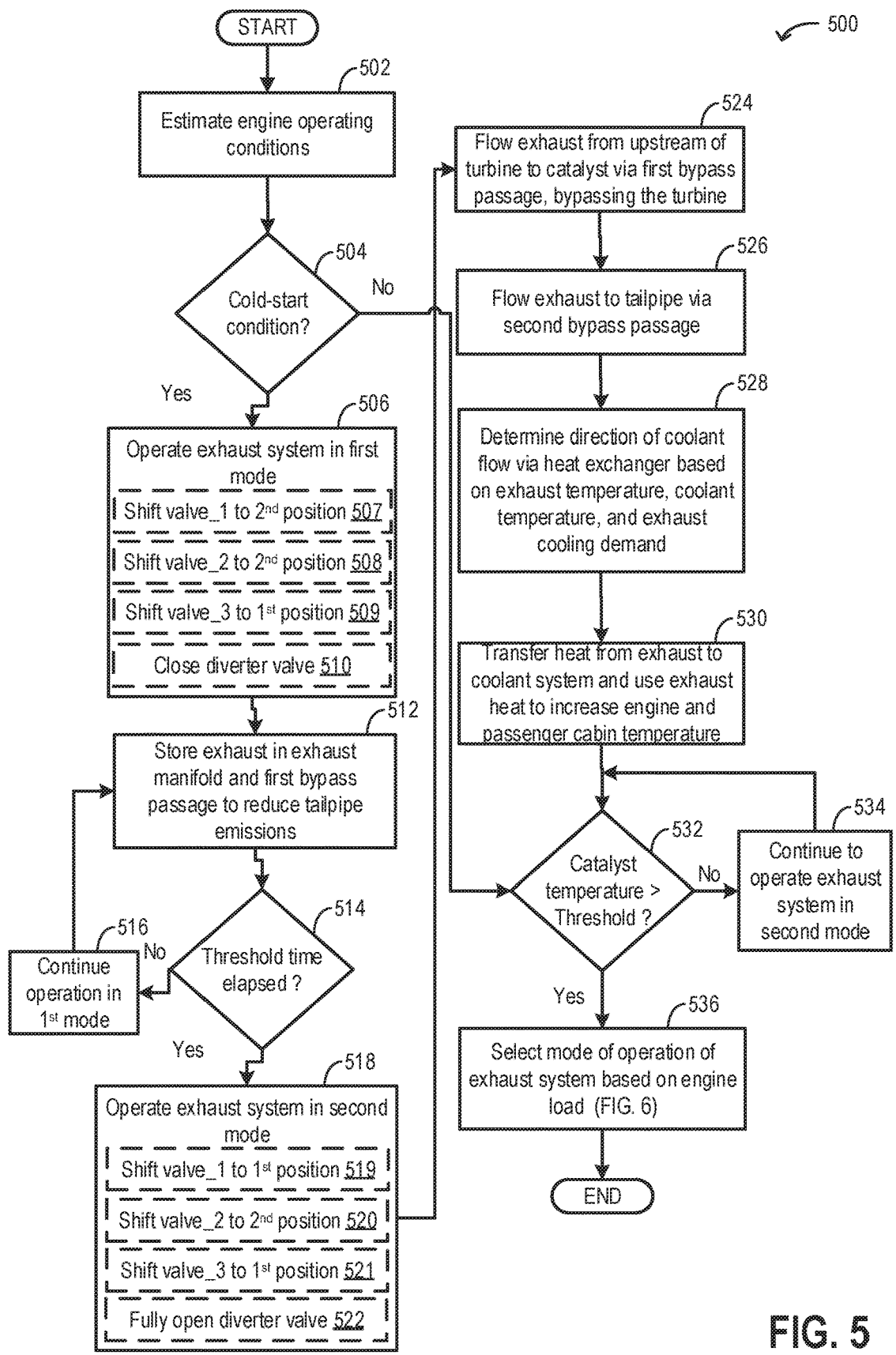
FIG. 5 shows a flow chart illustrating an example method that may be implemented for adjusting exhaust flow through the exhaust system of FIG. 1 during cold-start conditions.

FIG. 5 illustrates a first example method 500 that may be implemented for adjusting exhaust flow through the engine exhaust system of FIGS. 1-3. Instructions for carrying out method 500 and the rest of the methods included herein may be executed by a controller based on instructions stored on a memory of the controller and in conjunction with signals received from sensors of the engine system, such as the sensors described above with reference to FIGS. 1-3. The controller may employ engine actuators of the engine system to adjust engine operation, according to the methods described below.

At 502, the routine includes estimating and/or measuring engine operating conditions. Conditions assessed may include, for example, driver demand, engine temperature, engine load, engine speed, exhaust temperature, ambient conditions including ambient temperature, pressure, and humidity, manifold pressure and temperature, boost pressure, exhaust air/fuel ratio, etc.

At 504, the routine includes confirming an engine cold-start condition. An engine cold-start condition may be confirmed when the engine is started after a prolonged period of engine inactivity while the engine temperature is lower than a threshold (such as below an exhaust catalyst light-off temperature), and while ambient temperatures are below a threshold. During cold-start conditions, expedited catalyst heating and engine heating may be desired to reduce cold-start emissions. Additionally, passenger cabin heating may be desired by a vehicle operator. Furthermore, during an engine cold-start, exhaust gas recirculation (EGR) may not be desired.

If engine cold-start conditions are confirmed, at 506, the exhaust system may be operated in a first mode. In order to operate in the first mode, at 507, the controller may send a signal to an actuator coupled to a first exhaust valve, valve_1 (such as first three-way valve 162 in FIG. 1) to actuate valve_1 to a second position; at 508, the controller may send a signal to an actuator coupled to a second exhaust valve, valve_2 (such as second three-way valve 163 in FIG. 1) to actuate valve_2 to a second position; and at 509, the controller may send a signal to an actuator coupled to a third exhaust valve, valve_3 (such as third three-way valve 160 in FIG. 1) to actuate valve_3 to a first position. During operation of the exhaust system in the first mode, at 510, an exhaust diverter valve (such as diverter valve 176 in FIG. 1) may be maintained in a closed position to disable exhaust flow into the second bypass passage (such as second bypass passage 140 in FIG. 1). In addition, a timer may be started to measure a duration of engine operation in the first mode.

At 512, exhaust may be stored in sections of the exhaust system to reduce tailpipe emissions. Due to the first position of valve_3, exhaust may enter the first bypass passage (such as first bypass passage 184 in FIG. 1) from upstream of the turbine. Due to the second position of valve_2, the exhaust may then flow into the first portion (such as first portion 182 of EGR passage 180 in FIG. 1) of the EGR delivery passage. However, due to the second position of valve_1, the exhaust may not re-enter the main exhaust passage. Therefore, the hot exhaust may be confined within the exhaust manifold, the first bypass passage, and the first portion of the EGR delivery passage and exhaust may not be released to the atmosphere via the tailpipe. In this way, by reducing release of exhaust via the tailpipe immediately after an engine cold-start, undesired cold-start emissions may be reduced.

At 514, the routine includes determining if a threshold duration has elapsed (on the timer) since the engine start event during which the engine exhaust system is being operated in the first mode. During this threshold duration, hot exhaust is stored in the components of the exhaust system and not released to the atmosphere. In one example, the threshold duration may be one second. If it is determined that the threshold duration has not elapsed, at 516, the exhaust system may continue to be operated in the first mode.

If it is determined that the time elapsed since the engine start is higher than the threshold duration, at 518, the exhaust system may be transitioned to the second mode. In order to operate in the second mode, at 519, valve_1 may be actuated to a first position, at 520, valve_2 may be actuated to the second position, and at 521 valve_3 may be actuated to the first position. During operation of the exhaust system in the second mode, at 522, the controller may send a signal to an actuator coupled to diverter valve to actuate the diverter valve to a fully open position.

At 524, exhaust may be routed from upstream of the turbine to the catalysts via the first bypass passage, bypassing the turbine. Due to the first position of valve_3, exhaust may enter the first bypass passage from upstream of the turbine, and due to the second position of valve_2, the exhaust may then flow into the first portion of the EGR delivery passage. Due to the first position of valve_1, exhaust may re-enter the main exhaust passage downstream of the turbine and flow to the catalysts. At 526, due to the fully open position of the diverter valve, the entire volume of exhaust exiting the catalyst may flow to the tailpipe via the second bypass passage.

At 528, a direction of exhaust flow through the heat exchanger may be selected based on the engine heating demand, and further based on the exhaust temperature relative to the coolant temperature. As an example, during the cold-start, the coolant temperature may be low, and responsive to a lower than threshold coolant temperature, a switching valve may be actuated to a first position to simultaneously flow coolant through each of the first branch and the second branch of the heat exchanger in a first direction (from the coolant inlet to the coolant outlet) while exhaust flows through an arm of the second bypass passage that is coupled to the heat exchanger in a second direction (from the exhaust passage into the bypass passage), opposite the first direction. Due to the opposite directions of exhaust flow and coolant flow, a higher amount of heat transfer may take place from the exhaust to the coolant. However, if the coolant temperature is higher than a threshold temperature, switching valve may be actuated to a second position to simultaneously flow coolant through each of the first branch and the second branch of the heat exchanger in a second direction (from the coolant outlet to the coolant inlet) while exhaust flows through an arm of the bypass passage that is coupled to the heat exchanger in the second direction. Due to the parallel directions of exhaust flow and coolant flow, a lower amount of heat transfer may take place from the exhaust to the coolant, thereby reducing the increase in coolant temperature after exhaust heat transfer.

At 530, during exhaust flow through the part of the second bypass passage coupled to the heat exchanger, exhaust heat may be recovered at the heat exchanger. Specifically, heat from the exhaust may be transferred to a coolant flowing through the heat exchanger. By recovering the exhaust heat at the coolant, at a location downstream of the exhaust catalyst, a bulk of the exhaust heat can be used to warm (and thereby activate) the exhaust catalyst during the cold-start, reducing cold-start emissions. The exhaust heat remaining after heating the exhaust catalyst may be advantageously used to expedite engine heating during the cold-start. In particular, the warmed coolant can be circulated through the engine and/or through a heater core so that the heat can be utilized for heating other components of the vehicle system. For example, if cabin heating is requested by the vehicle operator due to the vehicle cabin temperature being lower than a desired temperature at the cold-start, warmed coolant may be circulated through the heater core and cabin heating may be provided. Thus, based on cabin heating demands, as requested by a vehicle operator (e.g., based on a cabin temperature setting), heat may be transferred from the heater core to the cabin. For example, air may be drawn into the cabin via the heater core, thereby enabling the cabin to be warmed. The warmed coolant may also be circulated to an engine block and cylinder head to raise engine temperatures, thereby reducing particulate matter emissions, and improving engine performance during cold ambient conditions.

At 532, the routine includes determining if the temperature of the exhaust catalyst is above a threshold temperature. The threshold temperature may correspond to the light-off (activation) temperature of the catalyst and a catalyst may function optimally at temperatures above this threshold temperature. As such it may be determined if each of one or more exhaust catalysts have attained their respective light-off (activation) temperatures. Also, if at 502, an engine cold-start condition is not confirmed, the routine may directly proceed to step 532 wherein it is determined if the catalyst temperature is higher than the threshold temperature. If it is determined that the temperature of the catalyst is lower than the threshold temperature, the exhaust system may continue to be operated in the second mode to expedite attainment of catalyst light-off temperature. If it is determined that the catalyst temperature is higher than the threshold temperature, at 536, a mode of operation of the exhaust system may be selected based on engine load. As such, exhaust gas recirculation may be desired based on engine operating conditions such as engine temperature, engine speed, and engine load. Details of further selection of the operating modes of the exhaust system are discussed in relation to FIG. 6.

Figure 6:
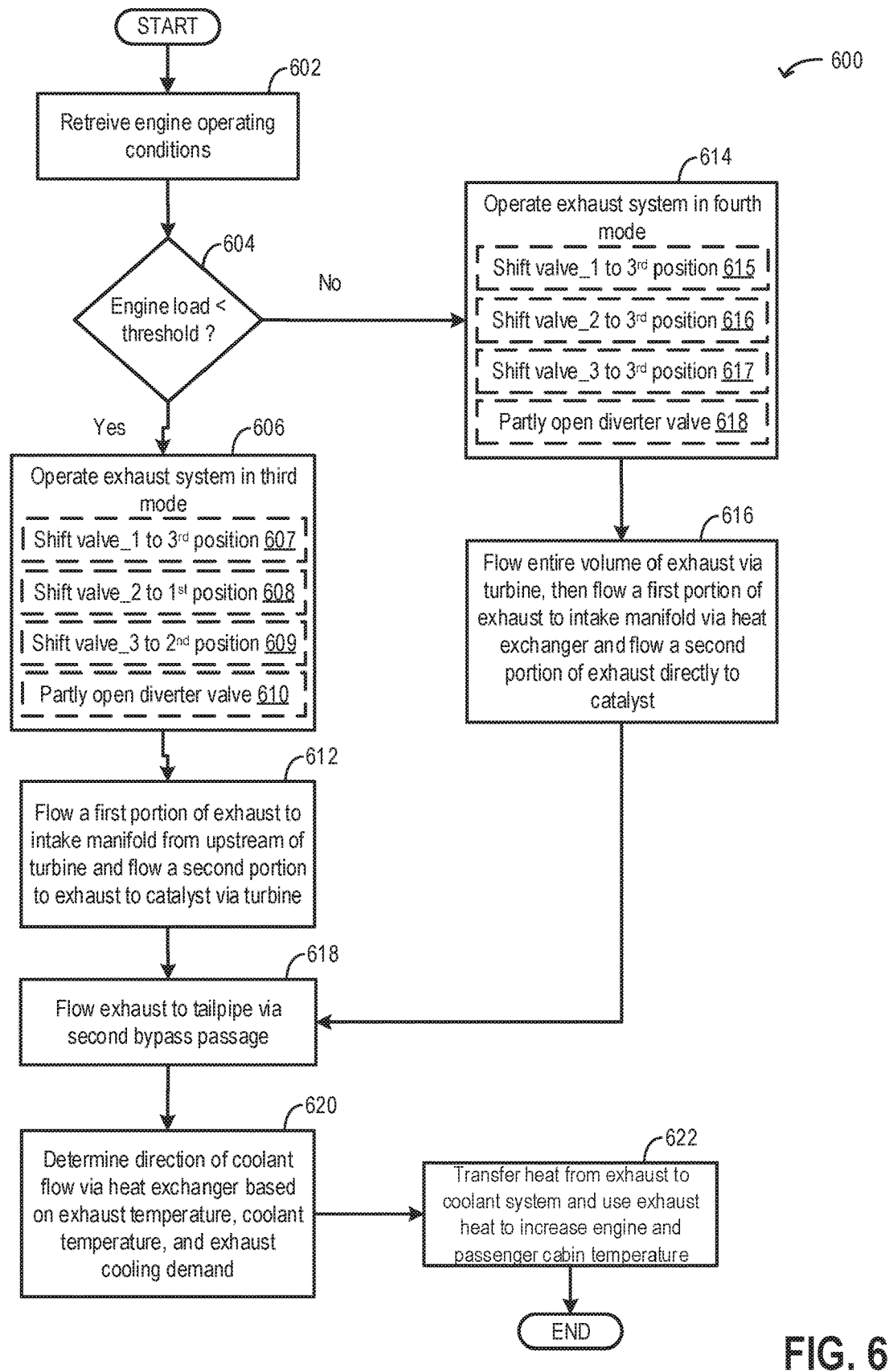
FIG. 6 shows a flow chart illustrating an example method that may be implemented for adjusting exhaust flow through the exhaust system of FIG. 1 based on engine load.

FIG. 6 illustrates a first example method 600 that may be implemented for adjusting exhaust flow through the engine exhaust system of FIGS. 1-3 based on engine load. The method 600 may be a part of the example method 500 of FIG. 5 and may be carried out at step 536 of method 500.

At 602, the routine includes retrieving engine operating conditions including engine load, engine speed, and engine temperature, as estimated in step 502 of method 500. At 604, the routine includes determining if the engine load is lower than a threshold engine load. The threshold engine load may correspond to conditions when the vehicle is accelerating and there is a higher demand for boost. If it is determined that the engine load is lower than the threshold engine load, the routine may proceed to step 606 to operate the exhaust system in a third mode. In order to operate in the third mode, at 607, valve_1 may be actuated to a third position, at 608, valve_2 may be actuated to a first position, and at 609, valve_3 may be actuated to a second position. During operation of the exhaust system in the third mode, at 610, the diverter valve may be actuated to a partially open position.

At 612, during operation of the exhaust system in the third mode, a first portion of exhaust may be routed to the intake manifold from upstream of the turbine while a second (remaining) portion of exhaust may be routed to the catalyst via the turbine. Due to the second position of valve_3, the first portion of exhaust may enter the first bypass passage from upstream of the turbine and due to the first position of valve_2, the first portion of exhaust may continue to the intake manifold via the EGR delivery passage (and not return to the main exhaust passage). The second portion of exhaust may not enter the EGR delivery passage due to the third position of valve_1 and may continue to the catalysts.

A ratio of the first portion to the second portion may be based on the desired EGR level which may be further based on engine operating conditions such as engine load, engine speed, engine temperature etc. The controller may determine the desired EGR level through a determination that directly takes into account determined engine speed, engine load, engine temperature, etc., such as increasing the EGR level as the engine load increases in the low-mid load region, and then decreasing the EGR amount as the engine load increases in the mid-high load region. The controller may alternatively determine the desired EGR level by referring to a look-up table stored in the controller's memory, input to the look-up table being engine speed and engine load, and the output being an EGR amount or the ratio of the first portion of exhaust to the second portion of exhaust. Based on the determined ratio, the opening of valve_3 may be regulated to allow the desired amount of exhaust to enter the first bypass passage and the EGR delivery passage, the opening increased as the first portion increases and the opening decreased as the first portion decreases.

At 618, due to the opening of the diverter valve, exhaust may flow to the tailpipe via the second bypass passage. The opening of the diverter valve may be adjusted to route a third portion of exhaust to the tailpipe via the bypass passage while a fourth portion of exhaust may directly flow to the tailpipe without entering the bypass passage. A ratio of the third portion of exhaust to the fourth portion of exhaust may be selected based on an engine heating demand and vehicle cabin heating demand. In one example, the controller may determine the third portion through a determination that directly takes into account engine temperature, cabin temperature, requested cabin temperature, etc. The controller may alternatively determine the third portion of exhaust relative to the fourth portion based on a calculation using a look-up table with the input being one or more of engine temperature, cabin temperature, requested cabin temperature, and the output being the degree of opening of the diverter valve. As yet another example, the controller may make a logical determination (e.g., regarding a position of the diverter valve) based on logic rules that are a function of parameters including engine temperature, cabin temperature, requested cabin temperature. The controller may then generate a control signal that is sent to the diverter valve to move the diverter valve to a position corresponding to the determined degree of opening. The opening of the diverter valve may be increased with an increase in the third portion and a corresponding decrease in the fourth portion of exhaust while opening of the diverter valve may be decreased with a decrease in the third portion and a corresponding increase in the fourth portion of exhaust. In one example, if engine heating or vehicle is not desired, the diverter valve may be actuated to a closed position and the entire volume of exhaust exiting the catalyst may be routed directly to the tailpipe.

At 620, a direction of exhaust flow through the heat exchanger may be selected based on the EGR cooling demand, the engine heating demand, and further based on the exhaust temperature relative to the coolant temperature. As an example, during a lower than threshold coolant temperature, the switching valve may be actuated to a first position to simultaneously flow coolant through each of the first branch and the second branch of the heat exchanger in a first direction (from the coolant inlet to the coolant outlet) while exhaust flows through an arm of the second bypass passage that is coupled to the heat exchanger in a second direction (from the exhaust passage into the bypass passage), opposite the first direction. Due to the opposite directions of exhaust flow and coolant flow, a higher amount of heat transfer may take place from the exhaust to the coolant. However, if the coolant temperature is higher than the threshold temperature, the switching valve may be actuated to a second position to simultaneously flow coolant through each of the first branch and the second branch of the heat exchanger in a second direction (from the coolant outlet to the coolant inlet) while exhaust flows through an arm of the bypass passage that is coupled to the heat exchanger in the second direction. Due to the parallel directions of exhaust flow and coolant flow, a lower amount of heat transfer may take place from the exhaust to the coolant, thereby reducing the increase in coolant temperature after exhaust heat transfer. The direction of coolant flow may also be based on EGR cooling demand and exhaust heat recovery demand. For example, when at least one of the EGR cooling demand and the exhaust heat recovery demand is higher, a higher degree of heat transfer may be achieved by flowing coolant through each of the first and second branch of the heat exchanger in a direction opposite to the direction of exhaust flow through each of the EGR passage and the bypass passage. In comparison, when at least one of the EGR cooling demand the exhaust heat recovery demand is lower, a lower degree of heat transfer may be achieved by flowing coolant through each of the first and second branch of the heat exchanger in the same direction as exhaust flow through each of the EGR passage and the bypass passage. In one example, when at least one of the EGR cooling demand and the exhaust heat recovery demand is higher, if the coolant temperature is higher than the threshold temperature, in order to reduce heat transfer from the exhaust to the coolant (such that the coolant temperature may not further increase) the switching valve may be actuated to a second position to flow coolant through each of the first branch and the second branch of the heat exchanger in the second direction (parallel to direction of exhaust flow).

At 622, during exhaust flow through the EGR passage and the second bypass passage, exhaust heat may be transferred to the coolant flowing through the heat exchanger. The warmed coolant can be circulated through the engine and/or through a heater core so that the heat may be utilized for heating other components of the vehicle system. For example, if cabin heating is requested by the vehicle operator due to the vehicle cabin temperature being lower than a desired temperature, warmed coolant may be circulated through the heater core and heat may be transferred from the heater core to the cabin.

However, at 604, if it is determined that engine load is higher than the threshold load, at 614, the exhaust system may be operated in a fourth mode. In order to operate in the fourth mode, at 615, valve_1 may be actuated to a third position, at 616, valve_2 may be actuated to a third position, and at 617, valve_3 may be actuated to a third position. During operation of the exhaust system in the fourth mode, at 618, the diverter valve may be actuated to a partially open position.

At 616, while operating the exhaust system in the fourth mode, the entire volume of exhaust may be routed via the turbine, and then a first portion of exhaust may be routed to the intake manifold from downstream of the turbine while a second (remaining) portion of exhaust may be routed directly to the catalyst. Due to the third position of valve_3 exhaust from upstream of the turbine may not enter the first bypass passage and the entire volume of exhaust may flow through the turbine. By routing the entire volume of exhaust through the turbine, a higher boost output may be delivered during higher than threshold engine load conditions. Due to the third position of valve_1, the first portion of exhaust may enter the EGR delivery passage and due to the third position of valve_2, the first portion of exhaust may continue to flow to the intake manifold via the EGR delivery passage. The ratio of the first to the second portion may be based on the desired EGR level which may be based on the engine's dilution requirement. The engine's dilution requirement may be estimated corresponding to the engine speed-load. As an example, the controller may rely on a model that correlates the change in engine load with a change in the engine's dilution requirement, and further correlates the change in the engine's dilution requirement with a change in the EGR requirement. The controller may send a signal to an actuator coupled to valve_1 to adjust the opening of valve_1 based on the ratio, the opening increased with an increase in the first portion and the opening decreased with a decrease in the first portion. In one example, EGR may not be desired during higher load conditions, and valve_1 may be fully closed to route the entire volume of exhaust exiting the turbine to the catalyst. The routine may then proceed to step 618, wherein at least a portion of exhaust may be routed to the tailpipe via the second bypass passage.

In this way, in response to a lower than threshold coolant temperature, the switching valve may be actuated to a first position to simultaneously flow coolant through each of the first branch and the second branch of the heat exchanger in a first direction, and heat from exhaust flowing through the arm of the EGR passage in the second direction may be transferred to coolant flowing through the first branch in the first direction, and heat from exhaust flowing through the arm of the bypass in the second direction to coolant flowing through the second branch of the heat exchanger in the first direction. Similarly, in response to a higher than threshold coolant temperature, the switching valve may be actuated to a second position to simultaneously flow coolant through each of the first branch and the second branch of the heat exchanger in a second direction, and heat from exhaust flowing through the arm of the EGR passage in the second direction may be transferred to coolant flowing through the first branch in the second direction, and heat from exhaust flowing through the arm of the bypass in the second direction to coolant flowing through the second branch of the heat exchanger in the second direction.

FIGS. 7 and 8, combined, show an example operating sequence 700, 800 illustrating operation of the engine exhaust system of FIGS. 1-3 during different engine operating conditions, over the same time period. The horizontal (x-axis) denotes time and the vertical markers t1-t5 identify significant times in the operation of the heat exchange system.

The first plot, line 702, shows the temperature of an exhaust catalyst as estimated based on exhaust temperatures. Dashed line 703 depicts the light-off (activation) temperature of the catalyst above which the catalyst may be optimally functional. The second plot, line 704, shows change in engine load as inferred based on input from a pedal position sensor, over time. The third plot, line 706, shows EGR flow from the exhaust manifold to the intake manifold via the EGR passage, corresponding to an EGR demand. The fourth plot, line 708, shows exhaust flow via the second exhaust bypass passage for exhaust heat recovery. The fifth plot, line 710, shows a variation in engine coolant temperature over time as estimated via a temperature sensor coupled to the coolant system, at the heat exchanger. Dashed line 711 shows a first threshold coolant temperature above which there may be a smaller temperature margin to coolant boiling point (overheating). Dashed line 709 shows a second threshold coolant temperature corresponding to the coolant boiling point. The sixth plot, line 712, shows a direction of coolant flow via each of the first branch and the second branch of the first embodiment of the heat exchanger (as shown in FIG. 1). The first plot in FIG. 8, line 802, shows a position of the first valve, valve_1 (such as valve 162 in FIG. 1), coupled to a junction of the main exhaust passage and the EGR delivery passage. The second plot, line 804, shows a position of the second valve, valve_2 (such as valve 163 in FIG. 1), coupled to a junction of the first exhaust bypass passage and the EGR delivery passage. The third plot, line 806, shows a position of the third valve, valve_3 (such as valve 160 in FIG. 1), coupled to a junction of the main exhaust passage and the first exhaust bypass passage. The fourth plot, line 808, shows a position of the diverter (such as valve 176 in FIG. 1), regulating exhaust flow through the second exhaust bypass passage.

Prior to time t1, the engine is shut down and the vehicle is not propelled using engine torque. At time t1, in response to an operator torque demand, the engine starts from rest after a period of inactivity. At the time of the engine start, the catalyst temperature is lower than the threshold temperature 703. Based on the lower than threshold catalyst temperature, engine cold-start conditions are confirmed. To reduce cold-start emissions, at t1, valve_1 is actuated to a second position, valve_2 is actuated to a second position, and valve_3 is actuated to a first (closed) position to flow the entire volume of exhaust from upstream of the turbine in the main exhaust passage to the first bypass passage and the first portion of the EGR delivery passage. Due to the valve settings, exhaust may not re-enter the exhaust passage or flow to the intake manifold. As a result, between time t1 and t2, exhaust is confined within the exhaust manifold, the first exhaust bypass passage, and the first portion of the EGR delivery passage. By disabling the release of exhaust to the atmosphere for a threshold duration, cold-start emissions are reduced. During this time, the diverter valve may be maintained in a closed position since exhaust heat recovery may not be carried out due to exhaust not being routed to the tailpipe.

At time t2, it may be determined that a threshold duration has elapsed since engine cold-start and confinement of exhaust within a section of the exhaust manifold. In response to the catalyst temperature being below the threshold 703, hot exhaust may now be routed to an exhaust catalyst to expedite attainment of catalyst light-off temperature. In order to route exhaust from upstream of the turbine directly to the catalyst, bypassing the turbine, valve_1 is actuated to a first position, valve_2 is maintained in the second position, and valve_3 is maintained in the first position. Also, the hot exhaust stored within the exhaust manifold, the first exhaust bypass passage, and the first portion of the EGR delivery passage (between time t1 and t2) is supplied to the catalyst. By bypassing the turbine, exhaust heat loss at the turbine may be reduced and the hot exhaust may be utilized for catalyst heating. Also, at time t2, the diverter valve may be fully opened to route the exhaust exiting the catalyst to the tailpipe via the second exhaust bypass passage. As the coolant temperature is below the first threshold 711, coolant may be routed through the second branch of the heat exchanger (direction of coolant flow via the first branch is same as direction of exhaust flow via the second branch) in a direction opposite to the direction of exhaust flow via the inlet pipe of the second bypass passage to increase heat transfer from the exhaust to the coolant. Therefore, between time t2 and t3, a switching valve is actuated to a first position to flow coolant routed through the second branch of the heat exchanger in a first direction (from the coolant inlet to the coolant outlet) with exhaust flowing through the bypass passage in a second direction (from the exhaust passage into the second bypass passage), the first direction opposite to the second direction. In alternate exhaust system configurations, such as with reference to the embodiments of the exhaust system shown in FIGS. 2 and 3, due to the increased demand for exhaust heat recovery during cold-start, coolant may be first routed through the second branch of the heat exchanger and then routed through the first branch. The heated coolant may then be circulated through the engine and/or the heater core and the recovered exhaust heat may be used for engine and/or vehicle cabin heating. Between time t2 and t3, due to exhaust flow, a temperature of the catalyst may gradually increase.

At time t3, the exhaust catalyst may reach the light-off temperature. Also, due to a change in engine load from low load to mid-load conditions, EGR may be requested. The controller may determine the desired EGR level through a determination that directly takes into account engine operation conditions such as engine speed and engine load. In order to route a first, larger portion of exhaust from upstream of the turbine to the intake manifold as EGR while flowing a second (smaller, remaining) portion of exhaust directly to the catalyst via the turbine, at time t3, valve_1 is actuated to a third position, valve_2 is actuated to a first position and valve_3 is actuated to a second position. Due to exhaust valve settings, between time t3 and t4, the first portion of exhaust may flow to the intake manifold from upstream of the turbine via the first bypass passage and the EGR delivery passage while the second portion of exhaust may flow through the turbine providing the desired boost and then flow through the catalyst. The opening of valve_3 is regulated based on the desired EGR amount, the opening increased with an increase in the EGR amount. Also, at this time there may be a demand for vehicle cabin heating and in order to recover exhaust heat, the diverter valve is actuated to a partially open position to route the exhaust exiting the catalyst to the tailpipe via the second exhaust bypass passage. The diverter valve may be in a partially open position to divert at least a portion (third portion) of exhaust exiting the catalyst into the second bypass passage while a remaining (fourth) portion of exhaust may directly flow to the tailpipe. The ratio of the third portion to the fourth portion may be based on vehicle cabin heating demands. In one example, the third portion may be increased while the fourth portion may be correspondingly decreased as the demand for vehicle cabin heating increases. The opening of the diverter valve may be adjusted based on the ratio of the third portion to the fourth portion, the opening increased as the third portion increases and the opening decreased as the third portion decreases.

As the coolant temperature is below the first threshold 711, coolant may be routed through each of the first branch and the second branch of the heat exchanger in the first direction as exhaust flows through the EGR delivery passage and the inlet pipe of the second exhaust bypass passage in the second direction. Due to the opposite directions of the exhaust flow and the coolant flow, a higher level of heat transfer may take place from the exhaust to the coolant. In this way, EGR may be cooled to a greater extent and a higher amount of exhaust heat may be recovered. Alternatively, in the second and third embodiments of the exhaust system, due to the increased demand for EGR cooling, the coolant may be first routed through the first branch of the heat exchanger and then routed through the second branch in order to first cool the exhaust in the EGR delivery passage and then recover heat from exhaust flowing through the bypass passage.

At time t4, there is an increase in engine load to above the threshold load 705 and a higher amount of boost may be desired for engine operation. In order to route the entire volume of exhaust via the turbine, valve_1 is maintained in the third position while valve_2 is actuated to a third position and valve_3 is actuated to a third position. Between time t4 and t5, due to the third position of valve_3, exhaust will not enter the EGR delivery passage and will continue to flow through the turbine and then a first portion of exhaust may enter the EGR delivery passage upstream of the catalyst while a second (remaining) portion of exhaust may flow to the tailpipe. The ratio of the first portion to the second portion may be based on EGR demand. Due to the higher engine load, the amount of EGR desired (between time t4 and t5) for engine operation may be lower than the amount of EGR desired between t3 and t4. At this time, further engine heating and/or vehicle cabin heating is not desired and the diverter valve may be actuated to a closed position to disable exhaust from entering the second bypass passage. Therefore, the second portion of exhaust may directly flow to the tailpipe from downstream of the catalyst. As the coolant temperature remains below the first threshold 711, in order to increase heat transfer from the exhaust to the coolant, coolant may be continued to be routed through the first branch of the heat exchanger in the first direction as exhaust flows through the EGR delivery passage in the second direction. In alternate exhaust system configurations, such as with reference to the embodiments of the exhaust system shown in FIGS. 2 and 3, as exhaust is not routed via the bypass passage, the coolant may be first routed through the first branch of the heat exchanger and then routed through the second branch in order to first cool the exhaust in the EGR delivery passage.

At time t5, it may be observed that the coolant temperature has increased to above the first threshold 711 and in order to reduce the possibility of coolant overheating, the switching valve may be actuated to a second position to flow the coolant through each of the first and the second branch of the heat exchanger in the second direction (from the coolant outlet to the coolant inlet). Between time t5 and t6, exhaust flows through the EGR passage in the second direction and due to the parallel directions of flow of exhaust and coolant flow, a lower level of heat transfer may take place from the exhaust to the coolant, thereby reducing the possibility of coolant overheating. Alternatively, in the second and third embodiments of the exhaust system, due to the increased coolant temperature, the coolant may be first routed through the second branch of the heat exchanger and then routed through the first branch in order to flow coolant in the same direction as the exhaust flowing through the EGR passage, thereby reducing heat transfer to the coolant.

At time t6, it may be observed that the engine load has decreased to below the threshold 705. In response to the decrease in engine load, there may be an increase in EGR demand and a decrease in boost demand. In order to decrease boost while providing the desired EGR, valve_1 is maintained in the third position, valve_2 is actuated to the first position and valve_3 is actuated to the second position. After time t6, due to exhaust valve setting, the first portion of exhaust may flow to the intake manifold from upstream of the turbine via the first bypass passage and the EGR delivery passage while the second portion of exhaust may flow through the turbine providing the desired boost and then flow through the catalyst. Due to the exhaust bypassing the turbine, the turbine speed drops and thereby boost pressure is reduced. The opening of valve_3 is increased as the amount of EGR supplied to the intake manifold increases. Also, at time t6 it is observed that the coolant temperature has reduced to below the first threshold 711, therefore the switching valve is actuated to the first position to flow the coolant through each of the first and the second branch of the heat exchanger in the first direction. As exhaust flows through the EGR passage in the second direction, due to the opposite directions of flow of exhaust and coolant flow, a higher level of heat transfer may take place from the exhaust to the coolant causing an increase in coolant temperature (coolant temperature remains below the first threshold 711). In this way, based on engine operating conditions, exhaust may be routed through the EGR passage and the second bypass passage for desired EGR supply, boost, and exhaust heat recovery.

In this way, by opportunistically adjusting a direction of coolant flow through the heat exchanger based on coolant temperature, overheating of coolant is avoided. By adjusting the sequence of coolant flow via a first and second branch of a heat exchanger, EGR cooling and exhaust heat recovery may be prioritized relative to one another, if desired, based on EGR cooling demands relative to engine heating demands. By flowing EGR and exhaust for heat recovery via two distinct passages, EGR cooling and exhaust heat recovery can be performed simultaneously, when required, using a single heat exchanger. The technical effect of containing exhaust within the exhaust manifold and first bypass passage during cold start conditions, and then routing hot exhaust directly to the catalysts, bypassing the turbine, is that cold-start tailpipe emissions may be reduced and catalyst light-off may be expedited. By recovering heat from exhaust downstream of the catalysts, attainment of catalyst light-off temperatures may be expedited and catalyst temperatures may be maintained above their activation temperatures. By including a first exhaust bypass passage, EGR can be sourced from both upstream and downstream of an exhaust turbine. By sourcing the EGR from upstream of the exhaust catalysts, emissions quality may be improved. Overall, by simultaneously providing EGR, and recovering exhaust heat for heating the engine and/or passenger cabin, fuel efficiency may be improved.

An example method comprises transferring heat from a first portion of exhaust flowing through an exhaust gas recirculation (EGR) passage to coolant in a first branch of a heat exchanger, and transferring heat from a second portion of exhaust flowing through an exhaust bypass to coolant in a second branch of the heat exchanger, a direction of coolant flow through the first and the second branch selected based on coolant temperature. In the preceding example, additionally or optionally, the first portion of exhaust flowing through the EGR passage includes exhaust drawn from a main exhaust passage based on engine load and delivered to an engine intake, upstream of a compressor, the first portion of exhaust drawn from upstream of a turbine when the engine load is lower than a threshold, and drawn from downstream of the turbine when the engine load is higher than the threshold. In any or all of the preceding examples, additionally or optionally, the second portion of exhaust flowing through the bypass includes the second portion of exhaust flowing from the main exhaust passage, downstream of each of the turbine and an exhaust catalyst, into the bypass, and from the bypass into a tailpipe via a diverter valve, the diverter valve coupled at a junction of an outlet of the bypass and the main exhaust passage. Any or all of the preceding examples further comprising, additionally or optionally, flowing a third portion of exhaust from upstream of the exhaust catalyst to the tailpipe, directly, without flowing through the EGR passage or the bypass. In any or all of the preceding examples, additionally or optionally, a ratio of the second portion of exhaust to the third portion of exhaust is based on an engine heating demand, the second portion increased relative to the third portion as the engine heating demand increases, and wherein an opening of the diverter valve is adjusted based on the second portion relative to the third portion, the opening increased with an increase in the second portion relative to the third portion. In any or all of the preceding examples, additionally or optionally, selecting the direction of coolant flow includes: flowing coolant simultaneously through each of the first branch and the second branch in a first direction while exhaust flows through the EGR passage and the bypass passage in a second direction when the coolant temperature is lower than a threshold temperature; and flowing coolant simultaneously through each of the first branch and the second branch in the second direction while exhaust flows through the EGR passage and the exhaust bypass in the second direction when the coolant temperature is higher than the threshold temperature, the first direction opposite to the second direction. Any or all of the preceding examples further comprises, additionally or optionally, flowing coolant simultaneously through each of the first branch and the second branch in the first direction until the coolant temperature reaches the threshold temperature, and then flowing coolant through each of the first branch and the second branch in the second direction. In any or all of the preceding examples, additionally or optionally, coolant enters each of the first branch and the second branch of the heat exchanger via a common coolant inlet and flows simultaneously through each of the first branch and the second branch, before combining at a common coolant outlet and exiting the heat exchanger, and wherein the direction of coolant flow via the first branch is same as the direction of coolant flow via the second branch. Any or all of the preceding examples further comprises, additionally or optionally, flowing heated coolant exiting the common coolant outlet through one or more of an engine block, a heater core, and a radiator based on engine heating demand relative to cabin heating demand. In any or all of the preceding examples, additionally or optionally, coolant flows sequentially through the first branch and the second branch of the heat exchanger, and wherein selecting the direction of coolant flow includes: flowing coolant through the first branch and then through the second branch when an EGR cooling demand is higher than the engine heating demand, and flowing coolant through the second branch and then through the first branch when the EGR cooling demand is lower than the engine heating demand, the EGR cooling demand based on engine dilution demand. Any or all of the preceding examples further comprising, additionally or optionally, for a threshold duration following an engine cold-start, containing exhaust within each of an exhaust manifold, a first exhaust bypass passage, and a first portion of the EGR passage by closing a first valve coupling the EGR passage to the main exhaust passage, and after the threshold duration has elapsed, opening the first valve to flow exhaust from upstream of the turbine to upstream of an exhaust catalyst via the first exhaust bypass, while bypassing the turbine, and then flowing exhaust from downstream of the exhaust catalyst to the tailpipe via the exhaust bypass. Any or all of the preceding examples further comprising, additionally or optionally, transferring heat from exhaust flowing from downstream of the exhaust catalyst to the tailpipe via the exhaust bypass to coolant flowing through the second branch of the heat exchanger, and then transferring heat from the coolant to the engine block based on engine heating demand.

Another example method for an engine comprises: diverting a first portion of exhaust from an exhaust passage into an exhaust gas recirculation (EGR) passage, diverting a second portion of exhaust from the exhaust passage into an exhaust bypass, transferring heat from the first portion of exhaust to coolant flowing through a first section of a branched heat exchanger, transferring heat from the second portion of exhaust to coolant flowing through a second section of the heat exchanger, and varying coolant flow through the first and second sections based on the first portion relative to the second portion. In any preceding example, additionally or optionally, the first portion of exhaust is based on engine dilution demand, and wherein diverting the first portion includes, during a higher than threshold engine load, adjusting opening of a first valve coupled to the exhaust passage, downstream of a turbine, to flow exhaust from downstream of the turbine to an engine intake, and during a lower than threshold engine load, adjusting opening of a second valve coupled to the exhaust passage, upstream of the turbine, to flow exhaust from upstream of the turbine to the engine intake, an opening of the first valve or the second valve increasing as the engine dilution demand increases. In any or all of the preceding examples, additionally or optionally, the second portion of exhaust is based on at least one of engine temperature and vehicle cabin heating demand, the second portion decreased as one of the engine temperature increases and vehicle cabin heating demand decreases, and wherein diverting the second portion includes increasing an opening of a diverter valve at a junction of the exhaust passage and the exhaust bypass as the engine temperature decreases, the opening of the diverter valve increased with an increase in the second portion. In any or all of the preceding examples, additionally or optionally, the heat exchanger is configured as a loop, wherein coolant flows through the first and second sections sequentially, wherein a direction of coolant flow through the first section is opposite to the direction of coolant flow through the second section, and wherein varying coolant flow includes varying an order of sequential coolant flow through the first and second sections based on the first portion relative to the second portion, the varying including coolant routed via the first section of the heat exchanger in a first direction and then via the second section in a second direction while exhaust flows through each of the EGR passage and exhaust bypass in the second direction when the first portion of exhaust is larger than the second portion of exhaust, and wherein the coolant is routed via the second section of the heat exchanger in the first direction and then via the first section in the second direction while exhaust flows through each of the EGR passage and the exhaust bypass in the second direction when the second portion of exhaust is larger than the first portion of exhaust. Any or all of the preceding examples further comprises, additionally or optionally, during an engine cold-start, for a threshold duration, confining an entire portion of exhaust within an exhaust manifold, a first exhaust bypass passage, and a first portion of the EGR passage, and after completion of the threshold duration, routing the entire portion of exhaust to a catalyst via the first exhaust bypass, bypassing the turbine, and then flowing the entire portion of exhaust to the tailpipe via the exhaust bypass while transferring exhaust heat to coolant flowing through the second section of the heat exchanger.

In yet another example, an engine system comprises: an intake manifold, an engine exhaust system including an exhaust passage and an exhaust catalyst, a turbocharger including a turbine coupled to the exhaust passage and a compressor coupled to the intake manifold, an EGR passage with a first valve for recirculating exhaust from the exhaust passage, upstream of the catalyst, to the intake manifold, a first exhaust bypass coupling the exhaust passage, from upstream of the turbine, to the EGR passage, a second valve coupled to a junction of the first exhaust bypass and the EGR passage, and a third valve coupled to a junction of the first exhaust bypass and the exhaust passage, a second exhaust bypass coupling the exhaust passage from downstream of the catalyst to upstream of a tailpipe via a diverter valve, a temperature sensor coupled to the exhaust passage, upstream of the catalyst, for estimating an exhaust temperature, a heat exchanger with a coolant inlet bifurcating into a first branch and a second branch, the first branch and the second branch rejoining at a coolant outlet, the first branch fluidically coupled to an arm of the EGR passage and the second branch fluidically coupled to an arm of the bypass passage, a coolant system with a coolant temperature sensor and a switching valve, the coolant system fluidically coupled to each of the heat exchanger, an engine block, and a heater core, and a controller with computer readable instructions stored on non-transitory memory for: in response to a lower than threshold coolant temperature, actuating the switching valve to a first position to simultaneously flow coolant through each of the first branch and the second branch of the heat exchanger in a first direction, and transferring heat from exhaust flowing through the arm of the EGR passage in a second direction to coolant flowing through the first branch in the first direction, and from exhaust flowing through the arm of the bypass passage in the second direction to coolant flowing through the second branch of the heat exchanger in the first direction, the first direction opposite to the second direction. In any preceding example, additionally or optionally, the controller includes further instructions for: in response to a higher than threshold coolant temperature, actuating the switching valve to a second position to simultaneously flow coolant through each of the first branch and the second branch of the heat exchanger in the second direction, and transferring heat from exhaust flowing through the arm of the EGR passage in the second direction to coolant flowing through the first branch in the second direction, and from exhaust flowing through the arm of the bypass in the second direction to coolant flowing through the second branch of the heat exchanger in the second direction. In any or all of the preceding examples, additionally or optionally, the exhaust flowing through the arm of the EGR passage includes a first portion of exhaust flowing from the exhaust passage, upstream of the catalyst, to the engine intake manifold via the passage, the first portion based on engine dilution demand, and wherein exhaust flowing through the arm of the bypass includes a second portion exhaust flowing from the exhaust passage, downstream of the catalyst, to a tailpipe via the bypass, the second portion based on engine heating demand.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   transferring heat from a first portion of exhaust from an engine flowing through an exhaust gas recirculation (EGR) passage to coolant in a first branch of a heat exchanger;
   transferring heat from a second portion of exhaust flowing through an exhaust bypass to coolant in a second branch of the heat exchanger;
   flowing a third portion of exhaust from downstream of an exhaust catalyst to a tailpipe, directly, without flowing through the EGR passage or the exhaust bypass; and
   selecting, via a controller, a direction of coolant flow through the first and the second branch based on a sensed coolant temperature.

2. The method of claim 1, wherein the first portion of exhaust flowing through the EGR passage includes exhaust drawn from a main exhaust passage based on engine load and delivered to an engine intake, upstream of a compressor, the first portion of exhaust drawn from upstream of a turbine when the engine load is lower than a threshold, and drawn from downstream of the turbine when the engine load is higher than the threshold, the turbine positioned in the main exhaust passage and coupled to the compressor which provides compressed air to the engine intake.

3. The method of claim 2, wherein the second portion of exhaust flowing through the exhaust bypass includes the second portion of exhaust flowing from the main exhaust passage, downstream of each of the turbine and the exhaust catalyst positioned in the main exhaust passage downstream of the turbine, into the exhaust bypass, and from the exhaust bypass into the tailpipe via a diverter valve, the diverter valve coupled at a junction of an outlet of the exhaust bypass and the main exhaust passage.

4. The method of claim 3, wherein a ratio of the second portion of exhaust to the third portion of exhaust is based on an engine heating demand, the second portion increased relative to the third portion as the engine heating demand increases, and wherein an opening of the diverter valve is adjusted based on the second portion relative to the third portion, the opening increased with an increase in the second portion relative to the third portion.

5. The method of claim 4, wherein coolant flows sequentially through the first branch and the second branch of the heat exchanger, and wherein selecting the direction of coolant flow includes:
   flowing coolant through the first branch and then through the second branch when an EGR cooling demand is higher than the engine heating demand; and
   flowing coolant through the second branch and then through the first branch when the EGR cooling demand is lower than the engine heating demand, the EGR cooling demand based on an engine dilution demand.

6. The method of claim 3, further comprising, for a threshold duration following an engine cold-start, containing exhaust within each of an exhaust manifold coupled to the engine, a first exhaust bypass passage, and a first portion of the EGR passage by closing a first valve coupling the EGR passage to the main exhaust passage downstream of the turbine, and after the threshold duration has elapsed, opening the first valve to flow exhaust from upstream of the turbine to upstream of the exhaust catalyst via the first exhaust bypass passage, while bypassing the turbine, and then flowing exhaust from downstream of the exhaust catalyst to the tailpipe via the exhaust bypass.

7. The method of claim 6, further comprising, transferring heat from exhaust flowing from downstream of the exhaust catalyst to the tailpipe via the exhaust bypass to coolant flowing through the second branch of the heat exchanger, and then transferring heat from the coolant to an engine block based on engine heating demand.

8. The method of claim 1, wherein selecting the direction of coolant flow includes:
   flowing coolant simultaneously through each of the first branch and the second branch in a first direction while exhaust flows through the EGR passage and the bypass passage in a second direction when the coolant temperature is lower than a threshold temperature; and
   flowing coolant simultaneously through each of the first branch and the second branch in the second direction while exhaust flows through the EGR passage and the exhaust bypass in the second direction when the coolant temperature is higher than the threshold temperature, the first direction opposite to the second direction.

9. The method of claim 8, further comprising, flowing coolant simultaneously through each of the first branch and the second branch in the first direction until the coolant temperature reaches the threshold temperature, and then flowing coolant through each of the first branch and the second branch in the second direction.

10. The method of claim 1, wherein coolant enters each of the first branch and the second branch of the heat exchanger via a common coolant inlet and flows simultaneously through each of the first branch and the second branch, before combining at a common coolant outlet and exiting the heat exchanger, and wherein the direction of coolant flow via the first branch is same as the direction of coolant flow via the second branch.

11. The method of claim 10, further comprising flowing heated coolant exiting the common coolant outlet through one or more of an engine block, a heater core, and a radiator based on engine heating demand relative to cabin heating demand.

12. An engine method comprising:
diverting a first portion of exhaust from an exhaust passage of an engine into an exhaust gas recirculation (EGR) passage;
diverting a second portion of exhaust from the exhaust passage into an exhaust bypass;
transferring heat from the first portion of exhaust to coolant flowing through a first section of a branched heat exchanger;
transferring heat from the second portion of exhaust to coolant flowing through a second section of the heat exchanger; and
varying coolant flow through the first and second sections based on the first portion relative to the second portion, via a switching valve,
wherein the heat exchanger is configured as a loop, coolant flows through the first and second sections sequentially, and a direction of coolant flow through the first section is opposite to the direction of coolant flow through the second section.

13. The method of claim 12, wherein the first portion of exhaust is based on engine dilution demand, and wherein diverting the first portion includes, during a higher than threshold engine load, adjusting opening of a first valve coupled to the exhaust passage, downstream of a turbine positioned in the exhaust passage, to flow exhaust from downstream of the turbine to an engine intake, and during a lower than threshold engine load, adjusting opening of a second valve coupled to the exhaust passage, upstream of the turbine, to flow exhaust from upstream of the turbine to the engine intake, an opening of the first valve or the second valve increasing as the engine dilution demand increases.

14. The method of claim 12, wherein the second portion of exhaust is based on at least one of an engine temperature and a vehicle cabin heating demand, the second portion decreased as one of the engine temperature increases and the vehicle cabin heating demand decreases, and wherein diverting the second portion includes increasing an opening of a diverter valve at a junction of the exhaust passage and the exhaust bypass as the engine temperature decreases, the opening of the diverter valve increased with an increase in the second portion.

15. The method of claim 12, wherein the varying coolant flow includes varying an order of sequential coolant flow through the first and second sections based on the first portion relative to the second portion, the varying including coolant routed via the first section of the heat exchanger in a first direction and then via the second section in a second direction while exhaust flows through each of the EGR passage and exhaust bypass in the second direction when the first portion of exhaust is larger than the second portion of exhaust, and wherein the coolant is routed via the second section of the heat exchanger in the first direction and then via the first section in the second direction while exhaust flows through each of the EGR passage and the exhaust bypass in the second direction when the second portion of exhaust is larger than the first portion of exhaust.

16. The method of claim 12, further comprising, during an engine cold-start, for a threshold duration, confining an entire portion of exhaust within an exhaust manifold, a first exhaust bypass passage, and a first portion of the EGR passage, and after completion of the threshold duration, routing the entire portion of exhaust to a catalyst positioned in the exhaust passage downstream of the turbine via the first exhaust bypass passage, bypassing the turbine, and then flowing the entire portion of exhaust to a tailpipe connected to the exhaust passage via the exhaust bypass while transferring exhaust heat to coolant flowing through the second section of the heat exchanger.

17. An engine system, comprising:
a turbocharger including a turbine coupled to an exhaust passage and a compressor coupled to an engine intake manifold;
an EGR passage with a first valve for recirculating exhaust from the exhaust passage, upstream of an exhaust catalyst, to the engine intake manifold;
a first exhaust bypass coupling the exhaust passage, upstream of the turbine, to the EGR passage, a second valve coupled to a junction of the first exhaust bypass and the EGR passage, and a third valve coupled to a junction of the first exhaust bypass and the exhaust passage;
a second exhaust bypass coupling the exhaust passage, downstream of the catalyst to upstream of a tailpipe, via a diverter valve;
a heat exchanger with a coolant inlet bifurcating into a first branch and a second branch, the first branch and the second branch rejoining at a coolant outlet, the first branch fluidically coupled to an arm of the EGR passage and the second branch fluidically coupled to an arm of the second exhaust bypass;
a coolant system with a coolant temperature sensor and a switching valve, the coolant system flowing coolant to each of the heat exchanger, an engine block, and a heater core; and
a controller with computer readable instructions stored on non-transitory memory for:
in response to a lower than threshold coolant temperature,
actuating the switching valve to a first position to simultaneously flow coolant through each of the first branch and the second branch of the heat exchanger in a first direction; and
transferring heat from exhaust flowing through the arm of the EGR passage in a second direction to coolant flowing through the first branch in the first direction, and from exhaust flowing through the arm of the second exhaust bypass in the second direction to coolant flowing through the second branch of the heat exchanger in the first direction, the first direction opposite the second direction.

18. The system of claim 17, wherein the controller includes further instructions for:
in response to a higher than threshold coolant temperature,
actuating the switching valve to a second position to simultaneously flow coolant through each of the first branch and the second branch of the heat exchanger in the second direction; and
transferring heat from exhaust flowing through the arm of the EGR passage in the second direction to coolant flowing through the first branch in the second direction, and from exhaust flowing through the arm of the second exhaust bypass in the second direction to coolant flowing through the second branch of the heat exchanger in the second direction.

19. The system of claim 17, wherein the exhaust flowing through the arm of the EGR passage includes a first portion of exhaust flowing from the exhaust passage, upstream of the catalyst, to the engine intake manifold via the EGR passage, and wherein exhaust flowing through the arm of the second exhaust bypass includes a second, remaining portion of exhaust flowing from the exhaust passage, downstream of the catalyst, to the tailpipe via the second exhaust bypass, the first portion relative to the second portion selected based on engine dilution demand relative to engine heating demand.

* * * * *